United States Patent
Nakajima et al.

(10) Patent No.: US 6,556,768 B1
(45) Date of Patent: Apr. 29, 2003

(54) RECORDING/REPRODUCTION APPARATUS CAPABLE OF EXCHANGING INFORMATION WITH STORAGE APPARATUS MOUNTED ON RECORDING MEDIUM ASSEMBLY

(75) Inventors: Yasuhisa Nakajima, Kanagawa (JP); Takao Ueda, Tokyo (JP); Kenji Hamamoto, Tokyo (JP); Nobukazu Sugiyama, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/993,993

(22) Filed: Dec. 18, 1997

(30) Foreign Application Priority Data

Dec. 25, 1996 (JP) .............................. 8-344863
Mar. 5, 1997 (JP) .............................. 9-050098

(51) Int. Cl.$^7$ ................................ H04N 5/70
(52) U.S. Cl. .................. 386/46; 360/69; 360/132; 386/83
(58) Field of Search ................ 386/1, 46, 83, 386/125–126; 360/61–64, 69, 72.1, 72.2, 132; 348/705–706; 455/4.1, 4.2, 186.1, 186.2, 6.1, 201, 41, 46

(56) References Cited

U.S. PATENT DOCUMENTS

| | | | | |
|---|---|---|---|---|
| 4,224,644 A | * | 9/1980 | Lewis et al. | 360/72.2 |
| 4,550,444 A | * | 10/1985 | Uebel | 455/41 |
| 4,786,981 A | * | 11/1988 | Sekimoto et al. | 360/14.3 |
| 4,982,324 A | * | 1/1991 | McConaught et al. | 364/200 |
| 5,054,112 A | * | 10/1991 | Ike | 455/41 |
| 5,068,521 A | * | 11/1991 | Yamaguchi | 235/492 |
| 5,070,500 A | * | 12/1991 | Horinouche et al. | 370/69.1 |
| 5,128,972 A | * | 7/1992 | Horinouchi et al. | 375/121 |
| 5,150,099 A | * | 9/1992 | Lienau | 340/552 |
| 5,293,400 A | * | 3/1994 | Monod et al. | 455/41 |
| 5,345,430 A | * | 9/1994 | Moe | 369/7 |
| 5,386,624 A | * | 2/1995 | George et al. | 29/832 |
| 5,488,409 A | * | 1/1996 | Yuen et al. | 386/83 |
| 5,521,590 A | * | 5/1996 | Hanaoka et al. | 340/825.54 |
| 5,621,913 A | * | 4/1997 | Tuttle et al. | 455/90 |
| 5,737,477 A | * | 4/1998 | Tsutsumi | 386/83 |
| 5,786,955 A | * | 7/1998 | Kori et al. | 360/72.1 |
| 5,822,145 A | * | 10/1998 | Nishida | 360/69 |
| 5,828,537 A | * | 10/1998 | d'Alayer de Costemor | 360/137 |
| 5,847,898 A | * | 12/1998 | Suzuki et al. | 360/69 |
| 5,903,407 A | * | 5/1999 | Tsai | 360/72.1 |
| 5,926,607 A | * | 7/1999 | Oguro et al. | 386/95 |
| 5,943,468 A | * | 8/1999 | Takayama | 386/113 |
| 5,956,456 A | * | 9/1999 | Bang et al. | 386/83 |
| 5,987,213 A | * | 11/1999 | Mankovitz et al. | 386/83 |
| 6,018,775 A | * | 1/2000 | Vossler | 710/1 |
| 6,091,884 A | * | 7/2000 | Yuen et al. | 386/83 |
| 6,101,070 A | * | 8/2000 | Oguro | 360/132 |
| 6,163,428 A | * | 12/2000 | Okuyama | 360/69 |
| 6,192,191 B1 | * | 2/2001 | Suga et al. | 386/120 |
| 6,240,240 B1 | * | 5/2001 | Nagano et al. | 386/83 |

\* cited by examiner

*Primary Examiner*—Thai Tran
(74) *Attorney, Agent, or Firm*—Frommer Lawrence & Haug LLP; William S. Frommer; Glenn F. Savit

(57) ABSTRACT

A recording/reproducing apparatus (e.g., VTR) includes capability to exchange information with a storage apparatus such as a memory card mounted on a recording medium assembly (e.g., cassette). When the cassette is inserted into a compartment in the compartment in a VTR, a switch in the VTR is pushed by the case of the cassette, detecting the insertion of the cassette into the compartment. At that time, a signal indicating the insertion of the cassette into the compartment is supplied to a microcomputer from the switch. Notified by the signal, the microcomputer issues a command to a reader/writer, requesting the reader/writer to read out information pertaining to data recorded on the cassette from the memory card mounted on the cassette for recording the data through an antenna. With the cassette located outside the compartment, on the other hand, the microcomputer issues a command to a reader/writer, requesting the reader/writer to read out the information from the memory card through another antenna.

2 Claims, 27 Drawing Sheets

| | MSB | | | | | | | LSB |
|---|---|---|---|---|---|---|---|---|
| #1Byte | SR | | | | DAY | | | |
| #2Byte | RP | | TCF | T/M | | | U/M | |
| #3Byte | | | T/Y | | | | U/Y | |
| #4Byte | | | | T/BM | | | | U/BM |
| #5Byte | | | | T/BH | | | | U/BH |
| #6Byte | | | | T/EM | | | | U/EM |
| #7Byte | | | | T/EH | | | | U/EH |
| #8Byte | | | | ID | | | | SEL |
| #9Byte | | | | | | | | CHR |
| #10Byte | | | | | | | | CHR |
| #11Byte | | | | | | | | CHR |
| #12Byte | | | | | | | | CHR |
| #13Byte | | | | | | | | CHR |

FIG. 18

| Byte | MSB | | | | | | | LSB |
|---|---|---|---|---|---|---|---|---|
| #1 Byte | | RM | | | | MIN | | |
| #2 Byte | | | WK | | | HR | | |
| #3 Byte | MSB | | YR | | | DAY | | |
| #4 Byte | | | YR | LSB | | MTH | | |
| #5 Byte | | | | SEL | | | ID | |
| #6 Byte | | | | | | | | CHR |
| #7 Byte | | | | | | | | CHR |
| #8 Byte | | | | | | | | CHR |
| #9 Byte | | | | | | | | CHR |
| #10 Byte | | | | | | | | CHR |
| #11 Byte | SR | RP | | CHN | | | AMD | |
| #12 Byte | VEF | AEF | N/C | | | STY | | |
| #13 Byte | | | KY1 | | | | KY0 | |
| #14 Byte | TXT | | BCT | | | | CNT | |
| #15 Byte | | | | | TCO | | | |
| #16 Byte | | | | | EBK | | | |

| Byte | | | | | | | | |
|---|---|---|---|---|---|---|---|---|
| #1 Byte | | | | | | | | TDP |
| #2 Byte | | | | | | | | CHR |

| Byte | | | | | | | | |
|---|---|---|---|---|---|---|---|---|
| #32 Byte | | | | | | | | CHR |

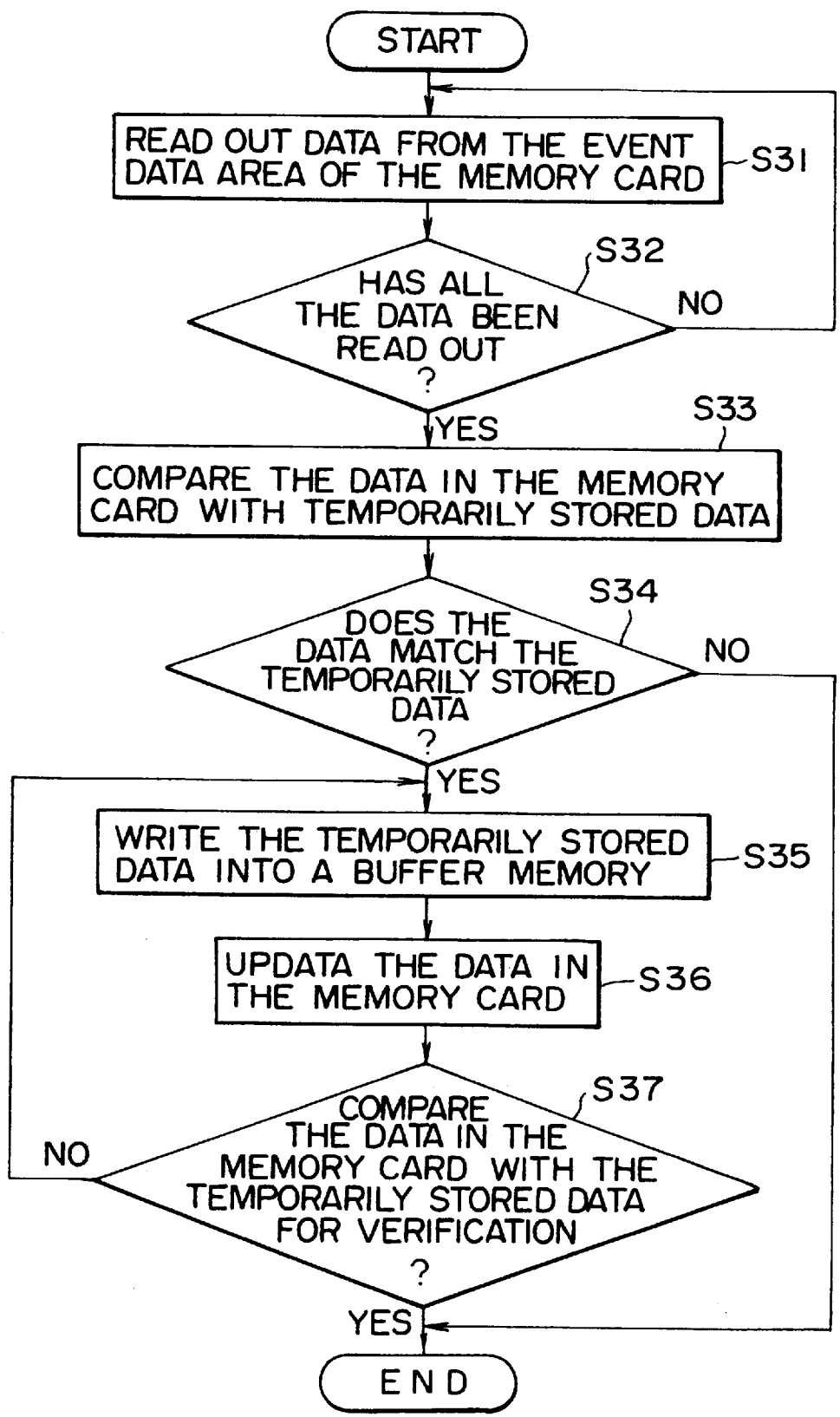

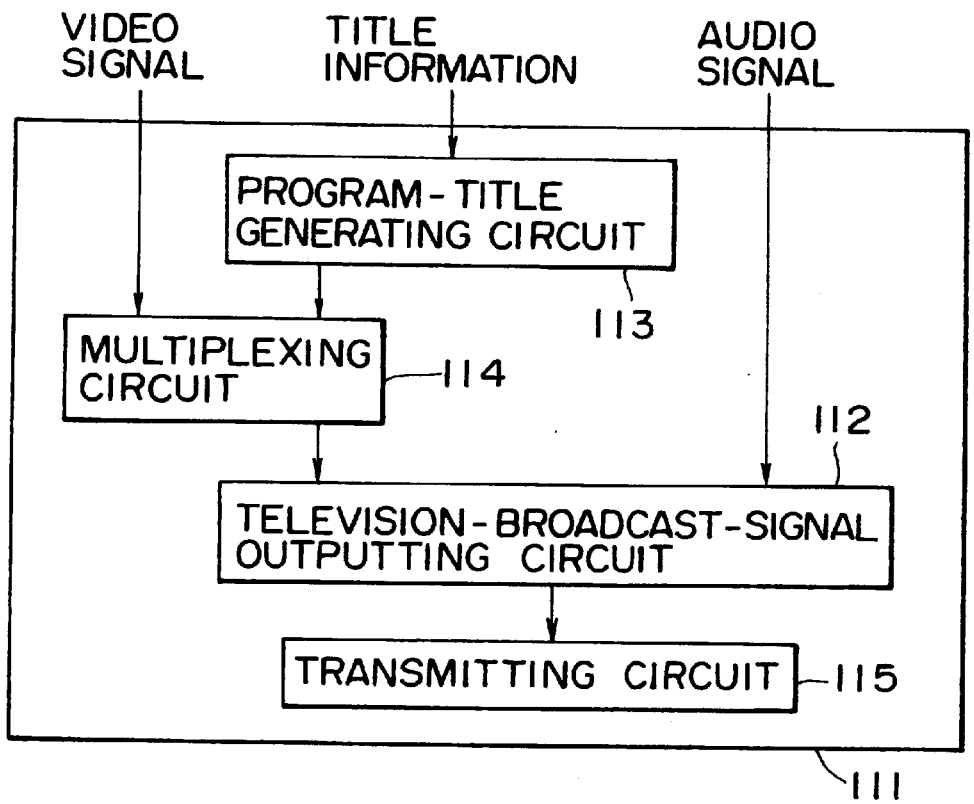
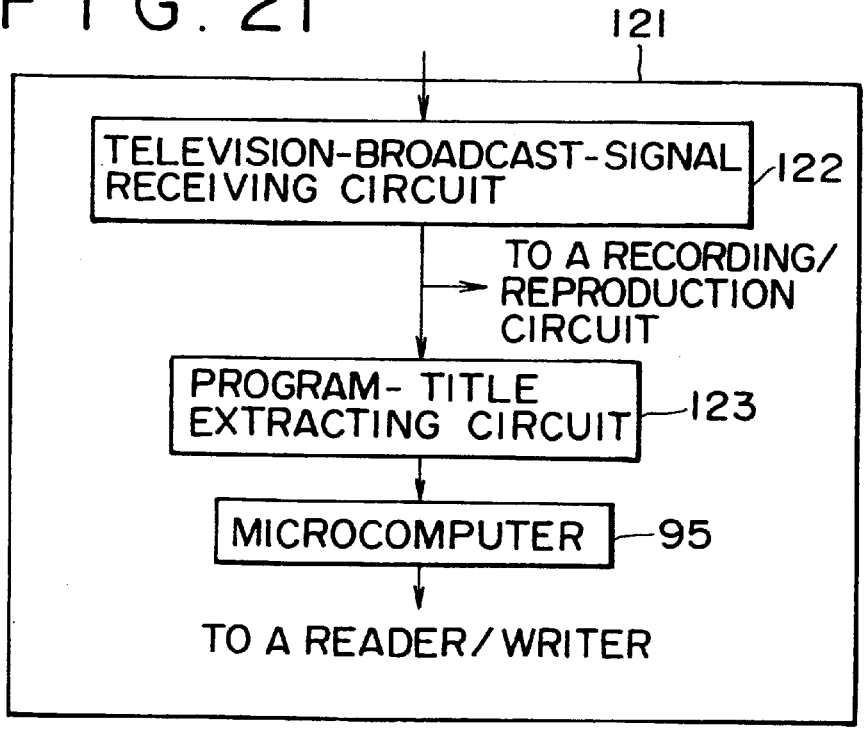

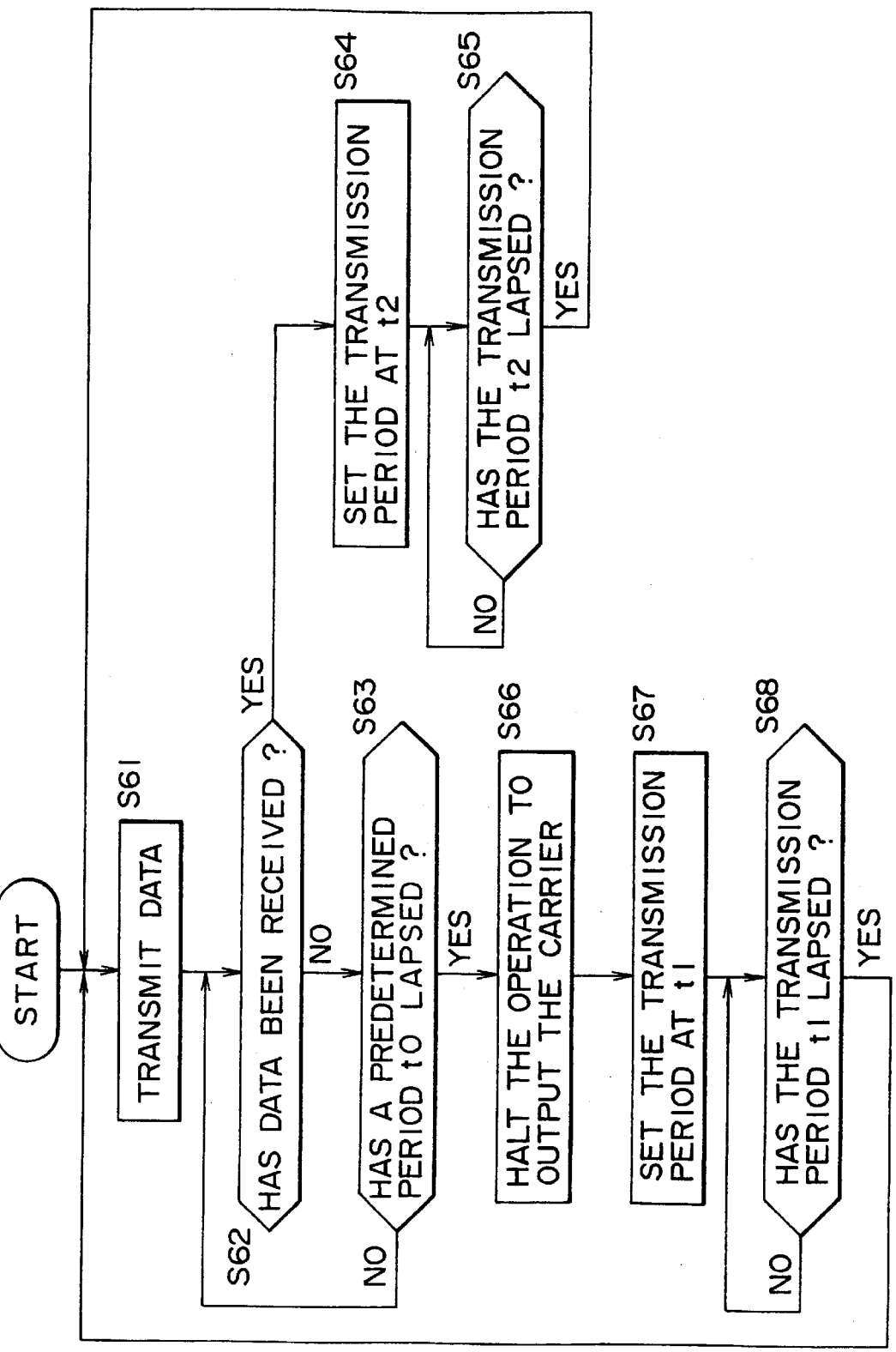

EXAMPLE OF AN OUTPUT CARRIER WITH NO RECEIVED DATA

EXAMPLE OF AN OUTPUT CARRIER WITH RECEIVED DATA

F I G. 32
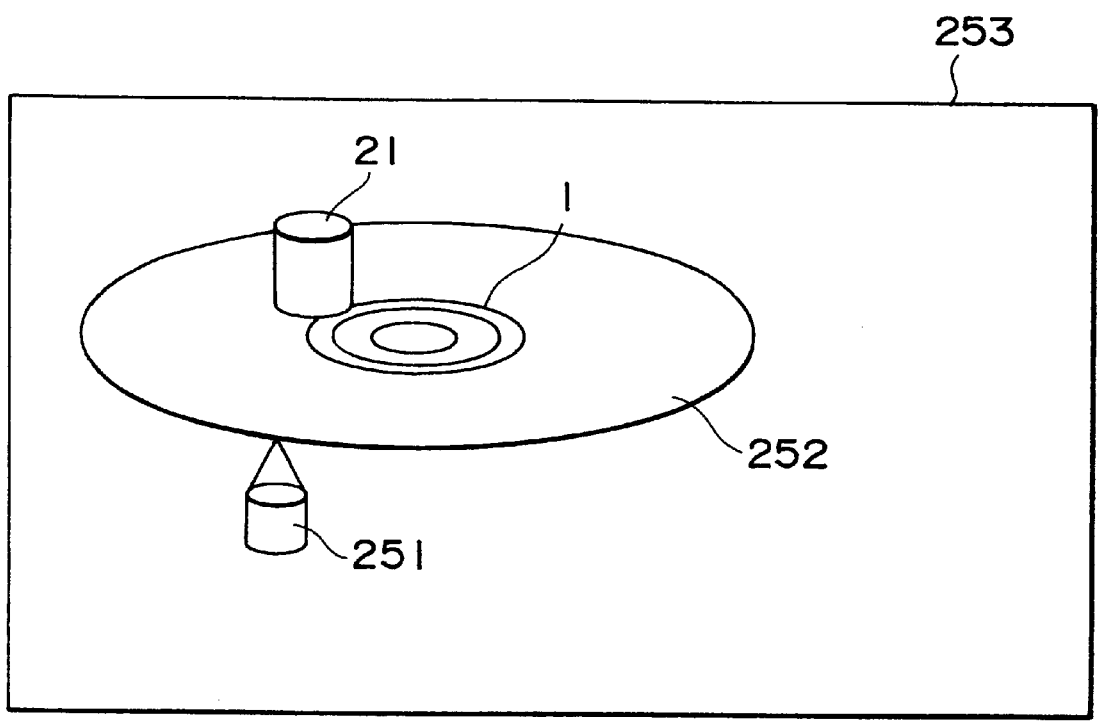

RECORDING/REPRODUCTION APPARATUS CAPABLE OF EXCHANGING INFORMATION WITH STORAGE APPARATUS MOUNTED ON RECORDING MEDIUM ASSEMBLY

BACKGROUND OF THE INVENTION

In general, the present invention relates to a recording/reproduction apparatus, a recording/reproduction method, an input/output apparatus, an input/output method, a storage apparatus, an information transmitting apparatus an information processing apparatus and an information processing method. To be more specific, the present invention relates to a recording/reproduction apparatus, a recording/reproduction method, an input/output apparatus, an input/output method, a storage apparatus, an information transmitting apparatus, an information processing apparatus and an information processing method that allow an index to data stored in a recording medium to be obtained with ease.

Cassette tapes and optical discs used in recording/reproduction apparatuses such as a VTR (Video Tape Recorder) and an optical-disc drive for recording and reproducing images and sounds are normally organized and controlled by utilizing index cards each used for recording an index to data recorded in the cassette tape or the optical disc such as information on the data including a recording date and a recording time of the data. Usually, an index card is coated with paste on the rear surface thereof which allows the index card to be stuck to a cassette tape or a disc. The user writes down information on data recorded in a cassette tape or a disk including a recording date and a recording time on such an index card and then sticks the index card on the cassette tape or the disc.

By the way, an electronic apparatus having a function known as a tape navigation is available. Such an electronic apparatus is used for rewinding a cassette tape to a start position when the cassette tape is mounted on the main body of a recording/reproduction apparatus or for positioning the head employed in the recording/reproduction apparatus at the start position of a disc when the disc is mounted on the main body of a recording/reproduction apparatus. Then, a reproduction operation is once carried out in order to display some of the contents of the cassette tape or the disc.

As an alternative, a seal with a bar code of the serial number of a cassette tape printed thereon is stuck to the cassette tape. The seal can then be used for identifying the cassette tape. As another alternative, an index to data recorded in each cassette tape can be stored in a host/target apparatus. When the cassette tape is mounted on the host/target apparatus, an index to data recorded in the cassette tape is displayed.

In addition, for cassette tapes and discs for use in a rental business, rental data is controlled typically by using a ledger or a PC. In this case, a bar code representing control information such as the serial number of a cassette tape or a disc is printed on a label such as a seal which is then stuck to the cassette tape or the disc.

In the case of an index card, however, the user himself must enter information on data recorded in the cassette tape or disc such as a recording date and a recording time by either writing the information with the hand or printing it, raising a problem of very cumbersome work.

In addition, as time goes by after data has been recorded, the user may forget the contents of the recording medium such as a cassette tape. In this case, the user verifies the contents of the cassette tape by playing back, rewinding or fast feeding the tape and then entering information on data recorded in the cassette tape including a recording date and a recording time, giving rise to a problem of cumbersome work.

In spite of the fact that an electronic apparatus having a function known as a tape navigation as described above is available, the contents of a cassette tape or a disc can not be known unless some of the contents are once reproduced after finding the start position of the cassette tape by rewinding the cassette tape or positioning the head employed in the apparatus at the start position of the disc. There is also adopted a method whereby a seal with a bar code of the serial number of a cassette tape printed thereon is stuck to the cassette tape for identifying the cassette tape, and an index to data recorded in each cassette tape is stored in a host/target apparatus. In this case, however, the cassette tape has to be mounted on the main body of the host/target apparatus, raising a problem of cumbersome work.

In the case of cassette tapes and discs for use in a rental business, there is encountered a problem that it is impossible to obtain information such as the borrowing period and the number of times data has been reproduced from a borrowed cassette tape or a disc.

BRIEF DESCRIPTION OF THE DRAWINGS

Embodiments of the present invention are described with reference to the following drawings wherein:

FIG. 11 is a diagram showing a typical structure of data stored in a memory card;

FIG. 12 is a diagram showing a typical data structure of a card data area shown in FIG. 11;

FIG. 14 is a diagram showing a typical data structure of a timer-based-video-recording-reservation data area shown in FIG. 11;

FIG. 18 is a diagram showing a typical data structure of an event data area shown in FIG. 11;

FIG. 19 shows a flowchart representing a procedure of processing to update information stored in the event data area;

FIG. 20 is a block diagram showing a typical configuration of an information transmitting apparatus provided by the present invention;

FIG. 21 is a block diagram showing a typical configuration of a VTR having a circuit for extracting the title of a program;

FIG. 27 shows a flowchart used for explaining the operation of the memory card and the reader/writer shown in FIG. 26;

FIG. 32 is a diagram showing an application of mounting a memory card on a CD-ROM.

SUMMARY OF THE INVENTION

Figure 1:
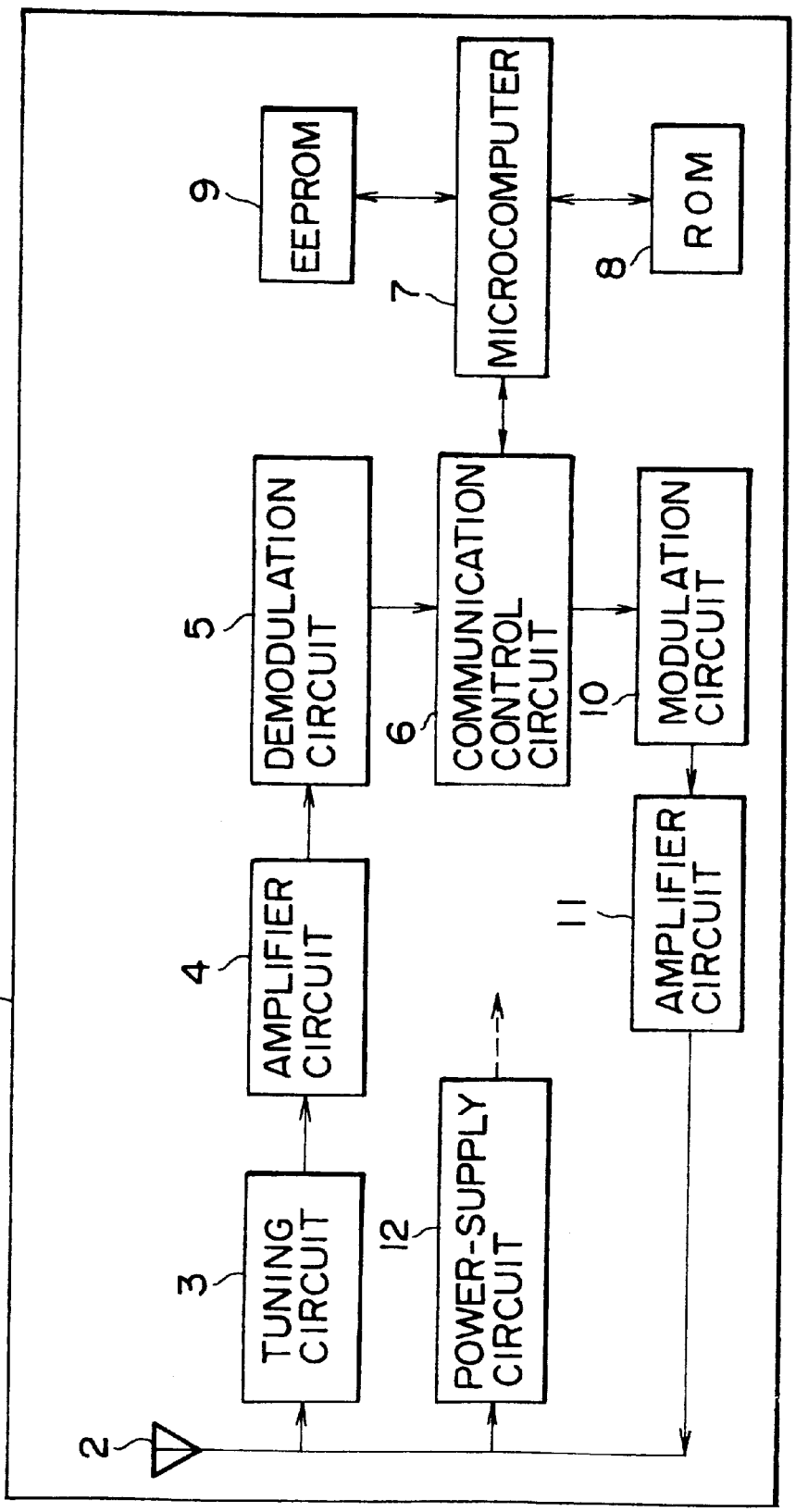
FIG. 1 is a block diagram showing a typical configuration of an embodiment implementing a non-contact-type memory card to which the storage apparatus provided by the present invention is applied.

Addressing the problems described above, it is thus an object of the present invention to provide a recording/reproduction apparatus, a recording/reproduction method, an input/output apparatus, an input/output method, a storage apparatus and an information transmitting apparatus that allow cassette tapes and discs to be controlled with ease and allow various kinds of information on cassette tapes and discs to be obtained.

In order to achieve the object described above, the present invention provides a recording/reproduction apparatus characterized by including:

a plurality of information transmitting/receiving means for transmitting and receiving information to and from a storage apparatus;

a switching means for switching the information transmitting/receiving means from one to another;

a reading means for reading out information stored in the storage apparatus through one of the information transmitting/receiving means selected by the switching means; and an information supplying means for supplying update information for updating the information stored in the storage apparatus through one of the information transmitting/receiving means selected by the switching means.

In addition, the present invention also provides a recording/reproduction method characterized by including the steps of:

selecting one of a plurality of information transmitting/receiving means for use in an operation to read out or write information from or into a storage apparatus through a selected one of the information transmitting/receiving means; and reading out information from the storage apparatus through the selected information transmitting/receiving means and updating the information stored in the storage apparatus through the selected information transmitting/receiving means;

On the top of that, the present invention also provides an input/output apparatus characterized by including:

an information transmitting/receiving means for transmitting and receiving information on data to and from a storage apparatus mounted on a recording-medium assembly for recording the data;

an information reading means for reading out information received through the information transmitting/receiving means and stored in the storage apparatus; and an information outputting means for outputting the information read out by the information reading means.

Furthermore, the present invention also provides an input/output method characterized by including the steps of:

transmitting and receiving information on data to and from a storage apparatus mounted on a recording-medium assembly for recording the data;

reading out information from the storage apparatus; and outputting the information read out from the storage apparatus.

In addition, the present invention also provides a storage apparatus for storing information as well as transmitting and receiving information to and from an external apparatus, the storage apparatus characterized by including:

a storage means for storing the information;

a power inputting means for inputting power supplied by the external apparatus;

an information providing means for providing the information stored in the storage means to the external apparatus; and an information updating means for updating the information stored in the storage means with the information received from the external apparatus.

On the top of that, the present invention also provides an information processing apparatus characterized by including:

a data reproducing means for reproducing data from a recording-medium assembly;

an information receiving means for receiving information stored in a storage apparatus from the storage apparatus; and an information adding/updating means for adding information received by the information receiving means to the data reproduced by the data reproducing means and/or using the information for updating the data.

In addition, the present invention also provides an information processing method characterized by including:

a data reproducing step of reproducing data from a recording-medium assembly;

an information receiving step of receiving information stored in a storage apparatus from the storage apparatus; and an information adding/updating step of adding information received at said information receiving setp to said data reproduced at said data reproducing step and/or using said information for updating said data.

On the top of that, the present invention also provides an information transmitting apparatus characterized by including:

an information superposing means for superposing second information to be stored in a storage apparatus on first information to be recorded into a recording-medium assembly; and an information transmitting means for transmitting the first information with the second information superposed thereon by the information superposing means.

DETAILED DESCRIPTION OF THE PREFERRED EMBODIMENTS

The present invention will become more apparent from a careful study of the following detailed description of some preferred embodiments with reference to accompanying diagrams showing the embodiments. Before explaining the embodiments, it is necessary to clarify relations associating means cited in the claims in the present specification with the embodiments in the following description by adding a phrase enclosed in parentheses after each of the means. The phrase exemplifies the means by specifying a component employed in an embodiment to implement the means.

As described in claim 1, a recording/reproduction apparatus for recording and reproducing data into and from a recording-medium assembly having a storage apparatus mounted thereon for storing predetermined information is characterized in that the recording/reproduction apparatus comprises:

a plurality of information transmitting/receiving means (implemented typically by antennas 22-1 and 22-2 shown in FIG. 9) for transmitting and receiving the information to and from the storage apparatus;

a switching means (implemented typically by a switch 94 shown in FIG. 9) for switching the information transmitting/receiving means from one to another;

a reading means (implemented typically by a microcomputer 95 shown in FIG. 9) for reading out the information stored in the storage apparatus through one of the information transmitting/receiving means selected by the switching means; and an information supplying means (implemented typically by the microcomputer 95 shown in FIG. 9) for supplying update information for updating the information stored in the storage apparatus through one of the information transmitting/receiving means selected by the switching means.

As described in claim 3, the recording/reproduction apparatus according to claim 1 is characterized in that the recording/reproduction apparatus further has a medium accommodating means (implemented typically by a compartment 93 shown in FIG. 9) for accommodating the recording-medium assembly and the switching means switches the information transmitting/receiving means from one to another in accordance with whether or not the recording-medium assembly exists in the medium accommodating means.

Figure 9:
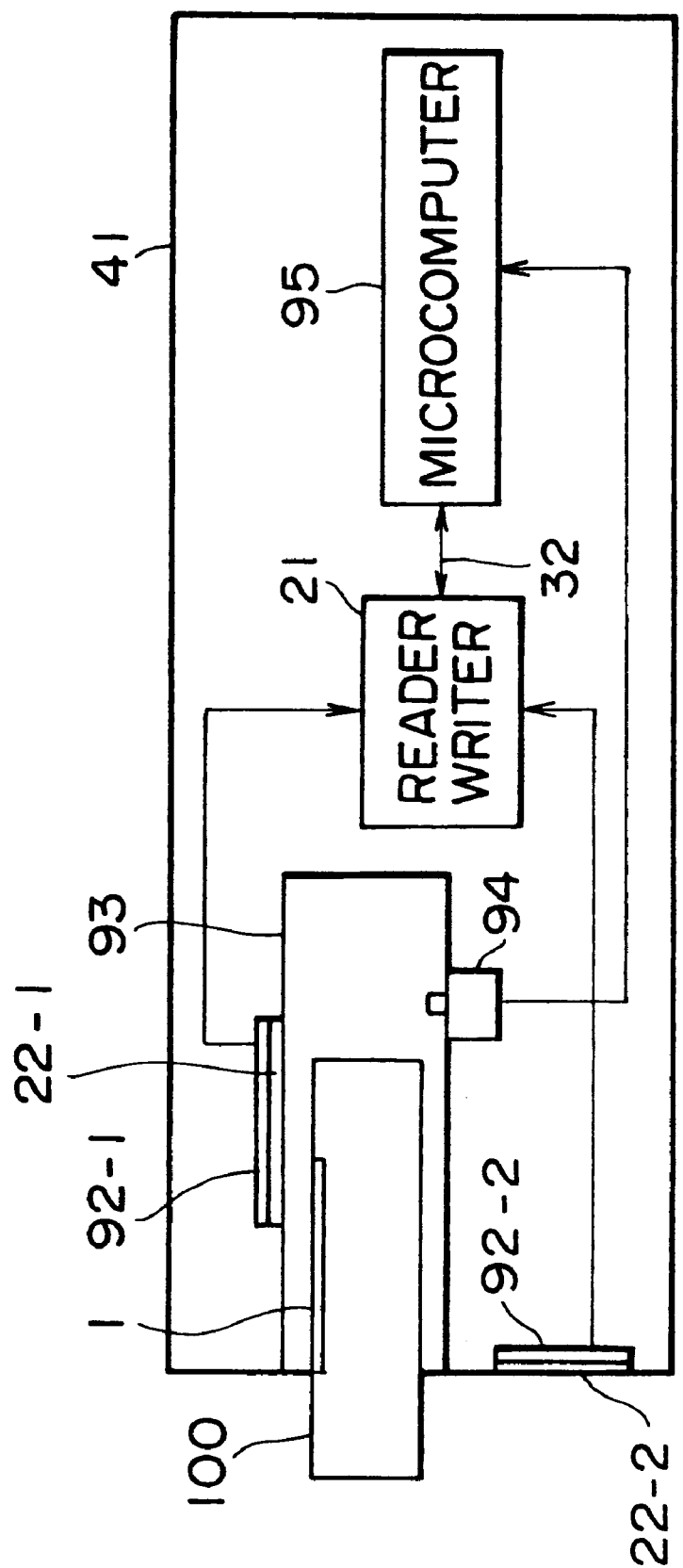
FIG. 9 is a diagram showing a typical application of a reader/writer with a plurality of antennas to a VTR.

As described in claim 5, the recording/reproduction apparatus according to claim 1 is characterized in that the recording/reproduction apparatus further has a power supplying means (implemented typically by the antennas 22-1 and 22-2 shown in FIG. 9) for supplying power to the storage apparatus.

Figure 10:
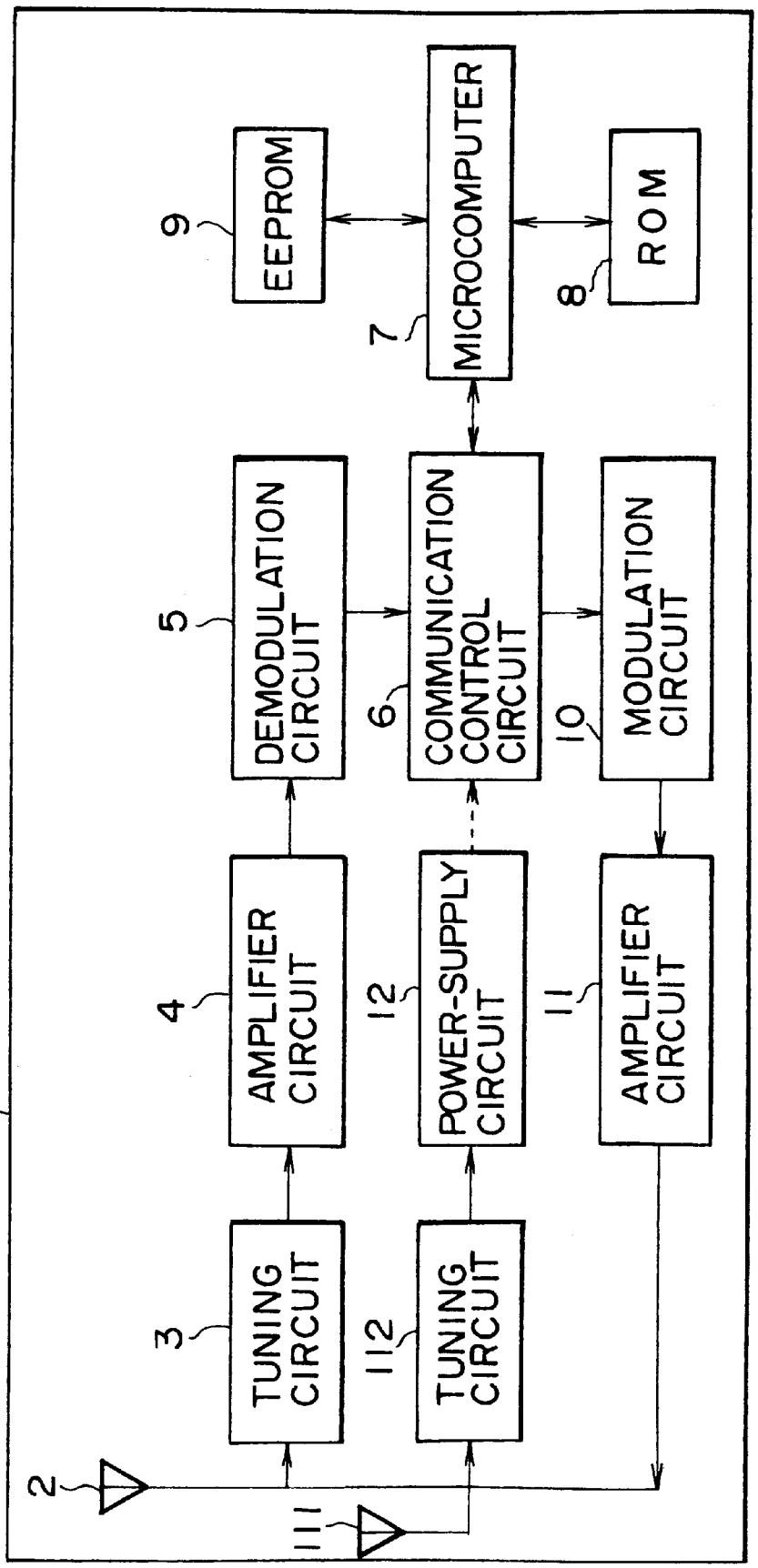
FIG. 10 is a block diagram showing a typical configuration of another embodiment implementing a non-contact-type memory card to which the storage apparatus provided by the present invention is applied.

As described in claim 8, the recording/reproduction apparatus according to claim 1 is characterized in that the storage apparatus comprises:

a storage means (implemented typically by an EEPROM unit 9 shown in FIG. 1) for storing the information;

a power inputting means (implemented typically by an antenna 2 and a power-supply circuit 12 shown in FIG. 1 or an antenna 111 and a power-supply circuit 12 shown in FIG. 10) for inputting power from a power supplying means;

an information providing means (implemented typically by the antenna 2 and a microcomputer 7 shown in FIG. 1) for providing the information stored in the storage means to the reading means through one of the information transmitting/receiving means; and an information updating means (implemented typically by the microcomputer 7 shown in FIG. 1) for updating the information stored in the storage means with the update information supplied by the information supplying means through one of the information transmitting/receiving means.

As described in claim 10, an input/output apparatus is characterized in that the apparatus comprises:

an information transmitting/receiving means (implemented typically by an antenna 22 shown in FIG. 2) for transmitting/receiving information to and from a storage apparatus for storing information on data recorded in a recording-medium assembly on which the storage apparatus is mounted;

an information reading means (implemented typically by a microcomputer 27 shown in FIG. 2) for reading out the information received through the information transmitting/receiving means and stored in the storage apparatus; and an information outputting means (implemented typically by a display unit 71a shown in FIG. 7) for outputting the information read out by the information reading means.

As described in claim 11, the input/output apparatus described in claim 10 is characterized in that the apparatus comprises an information updating means (implemented typically by the microcomputer 27 shown in FIG. 2) for updating the information received through the information transmitting/receiving means and stored in the storage apparatus.

As described in claim 15, a storage apparatus for storing information as well as transmitting and receiving information to and from an external apparatus is characterized in that the apparatus comprises:

a storage means (implemented typically by the EEPROM unit 9 shown in FIG. 1) for storing information;

a power inputting means (implemented typically by the power-supply circuit 12 shown in FIG. 1) for inputting power supplied by the external apparatus;

an information supplying means (implemented typically by the antenna 2 and the microcomputer 7 shown in FIG. 1)

for providing the information stored in the storage means to the external apparatus; and an information updating means (implemented typically by the microcomputer 7 shown in FIG. 1) for updating the information stored in the storage means with the information received from the external apparatus.

Figure 33:
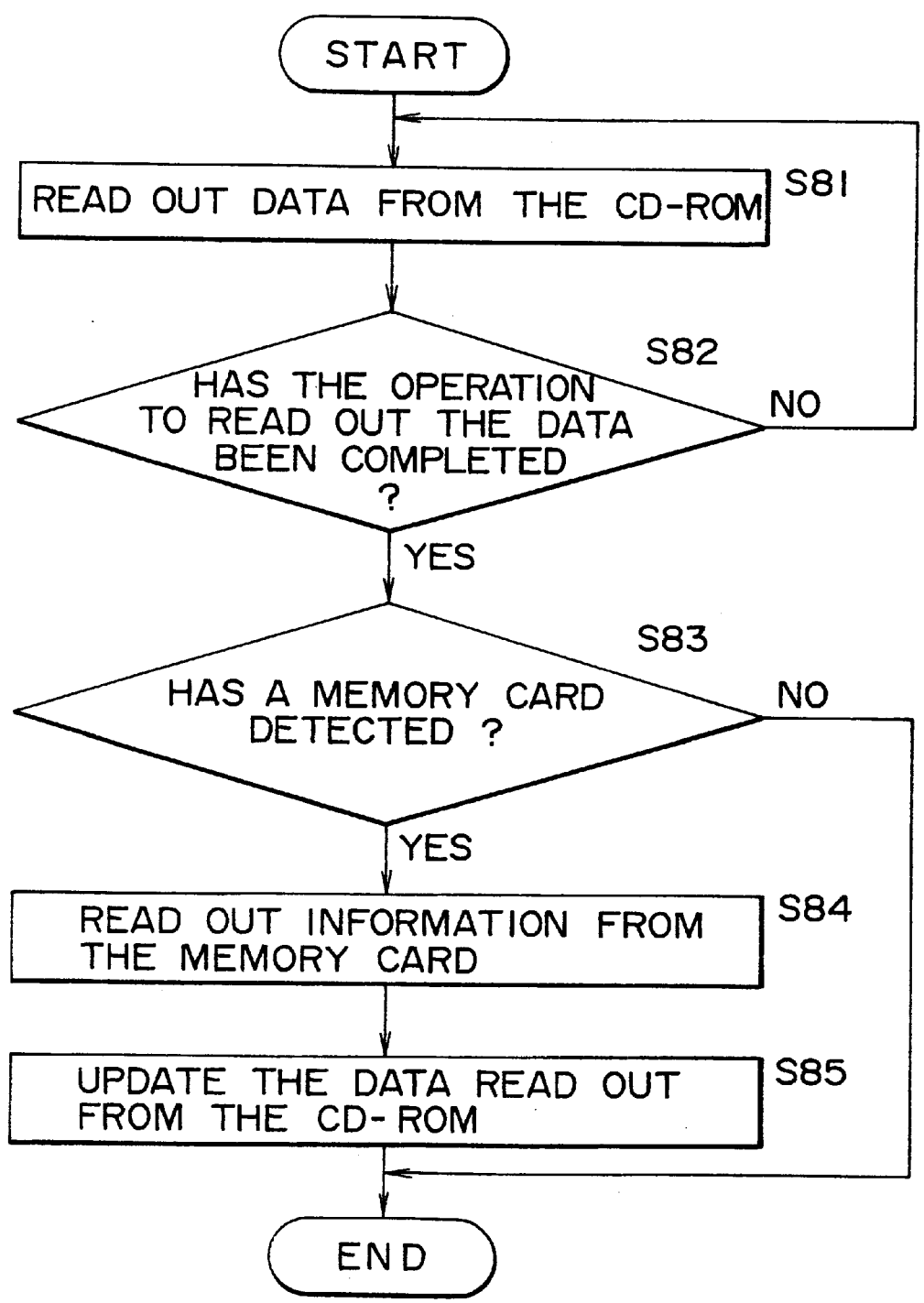
FIG. 33 shows a flowchart used for explaining the operation of the application shown in FIG. 32.

As described in claim 17, an information processing apparatus is characterized by comprising:

a data reproducing means (implemented typically by a step S81 of a flowchart shown in FIG. 33) for reproducing data from a recording-medium assembly;

an information receiving means (implemented typically by a step S84 of the flowchart shown in FIG. 33) for receiving information stored in a storage apparatus from the storage apparatus; and an information adding/updating means (implemented typically by a step S85 of the flowchart shown in FIG. 33) for adding information received by said information receiving means to said data reproduced by said data reproducing means and/or using said information for updating said data.

As described in claim 19, an information transmitting apparatus for transmitting data and predetermined information to a recording/reproduction apparatus for recording or reproducing the data into and from a recording-medium assembly on which a storage apparatus for storing the predetermined information is mounted is characterized in that the information transmitting apparatus comprises:

an information superposing means (implemented typically by a multiplexing circuit 114 shown in FIG. 20) for superposing the information to be stored in the storage apparatus on the data to be recorded into the recording-medium assembly; and an information transmitting means (implemented typically by a transmitting circuit 115 shown in FIG. 20) for transmitting the data with the information superposed thereon by the information superposing means.

As described in claim 21, an information storage apparatus comprises:

a storage means (implemented typically by the EEPROM unit 9 shown in FIG. 1) for storing information;

a power inputting means (implemented typically by the power-supply circuit 12 shown in FIG. 1) for inputting power supplied by an external apparatus;

an information supplying means (implemented typically by the antenna 2 and the microcomputer 7 shown in FIG. 1) for providing the information stored in the storage means to the external apparatus; and an information updating means (implemented typically by the microcomputer 7 shown in FIG. 1) for updating the information stored in the storage means with the information received from the external apparatus.

It should be noted that, while the means are exemplified by showing typical implementations, the above description is not intended to be construed in a limiting sense. That is to say, the means are of course not limited to the typical implementations given above.

FIG. 1 is a block diagram showing a typical configuration of a non-contact-type memory card 1 to which the storage apparatus provided by the present invention is applied. For the sake of description convenience, the non-contact-type memory card 1 is referred to hereafter simply as a memory card. An antenna 2 employed in the memory card 1 receives an electric wave from a non-contact-memory-card reader/writer 21 to be described alter. By the same token, the non-contact-memory-card reader/writer 21 is referred to hereafter simply as a reader/writer. The antenna 2 supplies a signal representing the electric wave received thereby to a tuning circuit 3 and a power-supply circuit 12. The tuning circuit 3 extracts only a signal with a carrier frequency for use in communication between the memory card 1 and the reader/writer 21 from the signal supplied thereto by the antenna 2.

An amplifier circuit 4 amplifies a signal supplied thereto by the tuning circuit 3 to a predetermined signal level, outputting the amplified signal to a demodulation circuit 5. The demodulation circuit 5 demodulates the amplified signal which was modulated at the carrier frequency, producing data conveyed by the modulated signal. A communication control circuit 6 carries out mode switching so as to allow a signal to be supplied by the demodulation circuit 5 to a microcomputer 7 or a signal to be supplied by the microcomputer 7 to a modulation circuit 10. The microcomputer 7 controls other components by executing a control program stored in a ROM (Read-Only Memory) unit 8. The microcomputer 7 also selects information, which needs to be stored in memory, from data received from the demodulation circuit 5 by way of the communication control circuit 6, supplying the information to an EEPROM (Electrically Erasable and Programmable Read-Only Memory) unit 9.

The EEPROM unit 9 stores the information supplied thereto by the microcomputer 7. The modulation circuit 10 uses data supplied thereto by the microcomputer 7 by way of the communication control circuit 6 for modulating a signal having a carrier frequency. An amplifier circuit 11 amplifies the carrier-frequency signal modulated by the modulation circuit 10 to a level required in the communication with the reader/writer 21. Finally, the antenna 2 transmits the carrier-frequency signal amplified by the amplifier circuit 11 as an electric wave.

Next, the operation of the memory card 1 is explained. First of all, a procedure of processing to receive an electric wave transmitted by the reader/writer 21 and to store information conveyed in the electric wave in the EEPROM unit 9 is explained. An electric wave received by the antenna 2 from the reader/writer 21 is converted into an electric signal corresponding to the electric wave which is then supplied to the tuning circuit 3. The tuning circuit 3 extracts only a signal with a predetermined carrier frequency from the electric signal supplied by the antenna 2, supplying the extracted carrier-frequency signal to the amplifier circuit 4. The amplifier circuit 4 amplifies the carrier-frequency signal supplied thereto by the tuning circuit 3 to a predetermined signal level, supplying the amplified signal to the demodulation circuit 5.

The demodulation circuit 5 demodulates the amplified signal supplied thereto by the amplifier circuit 4, supplying a demodulated signal to the communication control circuit 6. The communication control circuit 6, which has been switched to a reception mode at that time, converts the demodulated signal received from the demodulation circuit 5 into digital data to be supplied to the microcomputer 7. The microcomputer 7 forms a judgment as to whether or not the digital data supplied thereto by the communication control circuit 6 is data to be stored in the EEPROM unit 9 by the microcomputer 7. Depending on the outcome of the judgment, the digital data may be supplied to the EEPROM unit 9 to be stored therein.

By the way, the electrical signal generated by the antenna 2 is also supplied to the power-supply circuit 12. The power-supply circuit 12 fetches energy from the electrical signal supplied thereto by electromagnetic coupling with a carrier transmitted from the reader/writer 21, supplying power to components employed in the memory card 1. In this way, power can be supplied by an external source to the memory card 1.

The following is description of a case in which data (or a command) received by the microcomputer 7 from the reader/writer 21 through the communication control circuit 6 is a request for transmission of data stored in the EEPROM unit 9 to the reader/writer 21. When the microcomputer 7 receives the data (or a command) requesting transmission of data from the communication control circuit 6, the data is read out from the EEPROM unit 9, supplying the data to the communication control circuit 6. The communication control circuit 6 switches the operating mode to a transmission mode, supplying the data received from the microcomputer 7 to the modulation circuit 10.

The modulation circuit 10 uses the data received from the communication control circuit 6 to modulate a signal having a carrier frequency, supplying a modulated signal to the amplifier circuit 11. The amplifier circuit 11 amplifies the modulated signal supplied thereto by the modulation circuit 10 to a level required in the communication with the reader/writer 21. A signal amplified by the amplifier circuit 11 is then supplied to the antenna 2.

Figure 2:
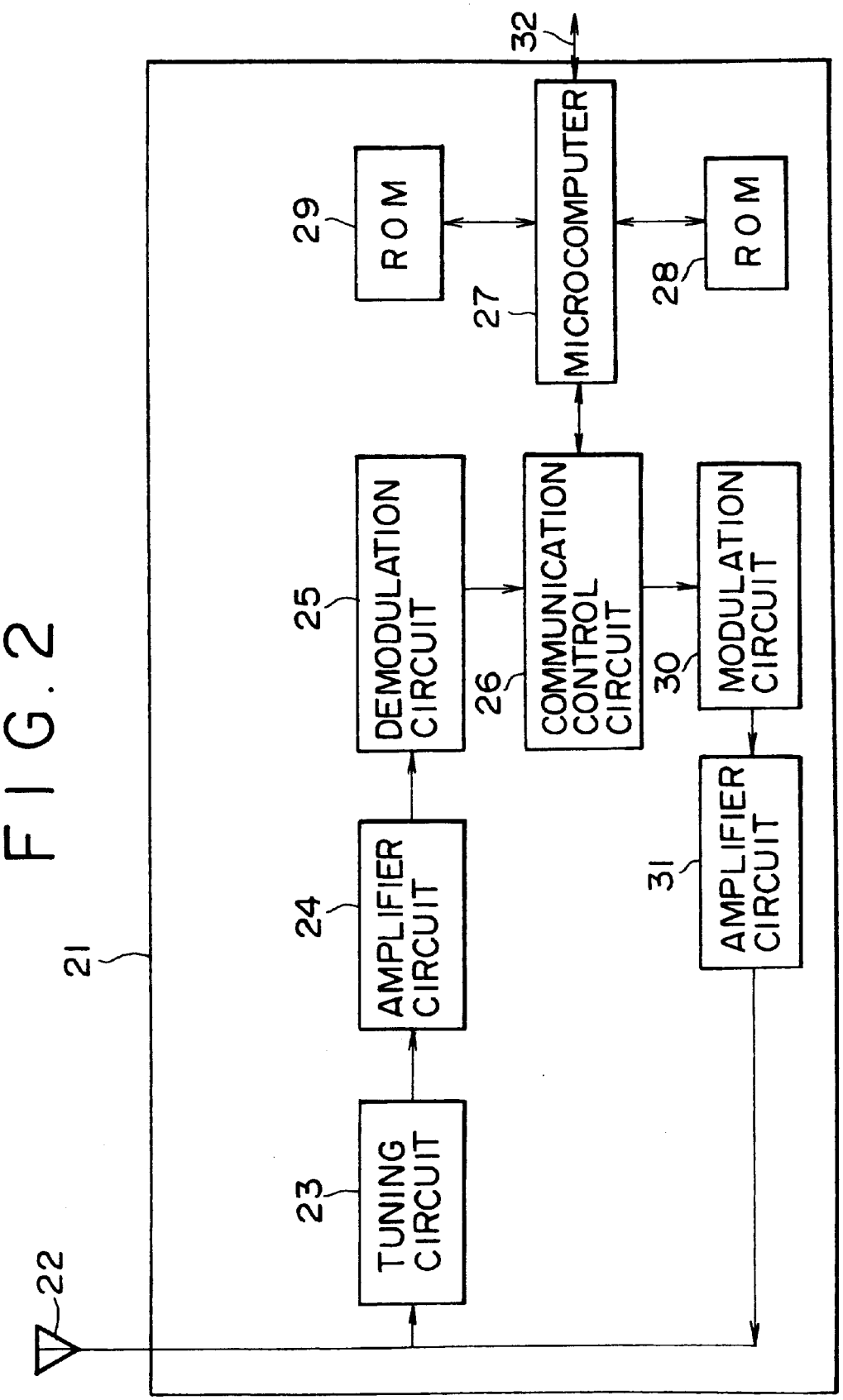
FIG. 2 is a block diagram showing a typical configuration of an embodiment implementing a non-contact-type-memory-card reader/writer to which an input/output apparatus provided by the present invention is applied.

FIG. 2 is a block diagram showing a typical configuration of a non-contact-type memory-card reader/writer to which the input/output apparatus provided by the present invention is applied. An antenna 22 shown in the figure transmits and receives a signal to and from the memory card 1. The signal has a predetermined carrier frequency which is required in the communication between the reader/writer 21 and the memory card 1. The reader/writer 21 also generates a magnetic field for supplying power to the memory card 1.

A tuning circuit 23 extracts only a signal with a carrier frequency for use in the communication between the memory card 1 and the reader/writer 21 from the signal supplied by the antenna 22. An amplifier circuit 24 amplifies a signal supplied thereto by the tuning circuit 23 to a predetermined signal level, outputting the amplified signal to a demodulation circuit 25. The demodulation circuit 25 demodulates the amplified signal which was modulated at the carrier frequency, producing data conveyed by the modulated signal. A communication control circuit 26 carries out mode switching so as to allow a signal to be supplied by the demodulation circuit 25 to a microcomputer 27 or a signal to be supplied by the microcomputer 27 to a modulation circuit 30. The microcomputer 27 controls other components by executing a control program stored in a ROM (Read-Only Memory) unit 28. The microcomputer 27 also selects information, which needs to be stored in memory, from data received from the demodulation circuit 25 by way of the communication control circuit 26, supplying the information to a RAM (Random-Access Memory) unit 29.

The RAM unit 29 stores the information supplied thereto by the microcomputer 27. The modulation circuit 30 uses data supplied thereto by the microcomputer 27 by way of the communication control circuit 26 for modulating a signal having a carrier frequency. An amplifier circuit 31 amplifies the carrier-frequency signal modulated by the modulation circuit 30 to a level required in the communication with the memory card 1. Finally, the antenna 22 transmits the carrier-frequency signal amplified by the amplifier circuit 31 as an electric wave.

Next, the operation of the reader/writer 21 is explained. First of all, a procedure of processing to receive data transmitted by the memory card 1 is explained. An electric wave received by the antenna 22 from the memory card 1 is converted into an electric signal corresponding to the electric wave which is then supplied to the tuning circuit 23. The tuning circuit 23 extracts only a signal with a predetermined carrier frequency from the electric signal supplied by the antenna 22, supplying the extracted carrier-frequency signal to the amplifier circuit 24. The amplifier circuit 24 amplifies the carrier-frequency signal supplied thereto by the tuning circuit 23 to a predetermined signal level, supplying the amplified signal to the demodulation circuit 25.

The demodulation circuit 25 demodulates the amplified signal supplied thereto by the amplifier circuit 24, supplying a demodulated signal to the communication control circuit 26. The communication control circuit 26 switches the operating mode to a reception mode, converting the demodulated signal received from the demodulation circuit 25 into digital data to be supplied to the microcomputer 27. The microcomputer 27 stores the digital data in the RAM unit 29 prior to transmission to an external circuit not shown in the figure through a communication line 32.

The following is description of a case in which a data-transmission request is issued to request that predetermined data be transmitted from the reader/writer 21 to the memory card 1. In this case, if necessary, the data to be transmitted to the memory card 1 is received from the external circuit by the microcomputer 27 by way of the communication line 32. The microcomputer 27 supplies the data transmitted thereto from the external circuit by way of the communication line 32 or data already stored in the RAM unit 29 to the communication control circuit 26.

The communication control circuit 26 converts the data supplied thereto by the microcomputer 27 into an analog signal, supplying the analog signal to the modulation circuit 30. The modulation circuit 30 uses the analog signal received from the communication control circuit 26 to modulate a signal having a carrier frequency, supplying a modulated signal to the amplifier circuit 31. The amplifier circuit 31 amplifies the modulated signal supplied thereto by the modulation circuit 30 to a level required in the communication with the memory card 1. A signal amplified by the amplifier circuit 31 is then supplied to the antenna 22 for transmission to the memory card 1.

The signal transmitted through the antenna 22 is received by the antenna 2 employed in the memory card 1 to be finally stored in the EEPROM unit 9 as described above.

As described above, data can be exchanged between the memory card 1 and the reader/writer 21.

Figure 3:
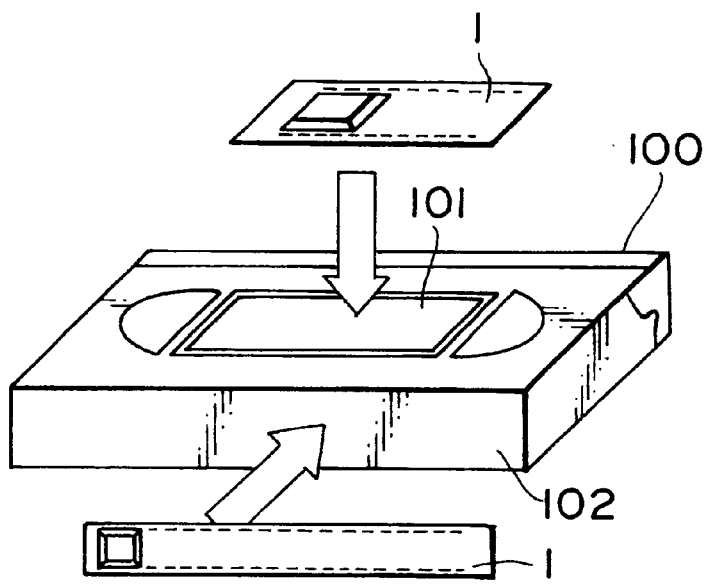
FIG. 3 is a diagram showing a state in which a non-contact-type memory card is mounted on a cassette.

FIG. 3 is a diagram showing a state in which a memory card 1 shown in FIG. 1 is mounted in each of dents 101 and 102 provided on an case of a cassette 100.

Figure 4:
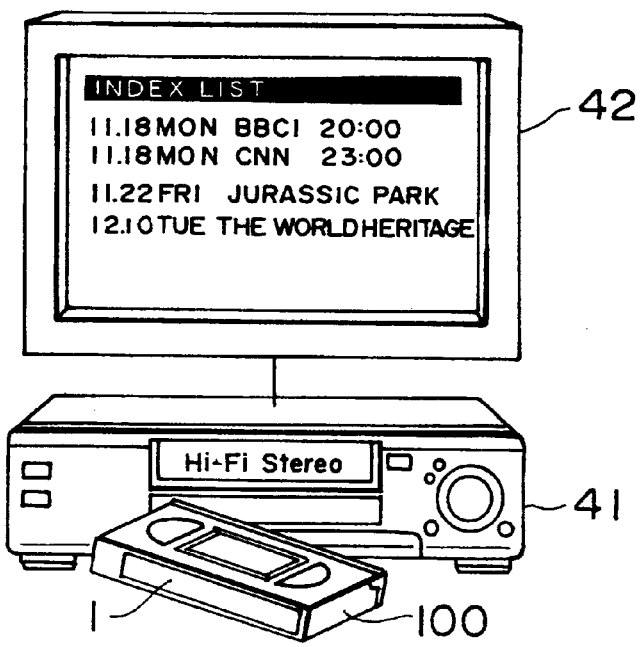
FIG. 4 is a diagram showing an embodiment implementing communication with a non-contact-type memory card.

FIG. 4 is a diagram showing a state in which, even if a cassette 100 having a memory card 1 mounted therein is not set in a VTR 41, by merely bringing the cassette 100 to a location in close proximity to the VTR 41, communication between the VTR 41 and the cassette 100 can be established, allowing data stored in the memory card 1 to be displayed on a screen of a television receiver 42 connected to the VTR 41.

In this example, the VTR 41 is provided with a reader/writer 21 shown in FIG. 2. The reader/writer 21 is installed on the VTR 41 so that the antenna 22 of the reader/writer 21 is directed to the outside of the VTR 41. In this way, communication can be established between the memory card 1 mounted on the cassette 100 and the reader/writer 21 installed on VTR 41, allowing the reader/writer 21 to read out data stored in the memory card 1. The data read out from the memory card 1 is then supplied to the television receiver 42 to be displayed on a screen thereof.

In this example, the television receiver 42 displays data stored in the memory card 1. Thus, if a request is received by the television receiver 42 from the VTR 41 when the television receiver 42 is in a stand-by state, the power supply is turned on and the television receiver 42 is switched to a mode to receive a video/audio signal from the VTR 41 and to display an image supplied by the VTR 41.

Figure 5:
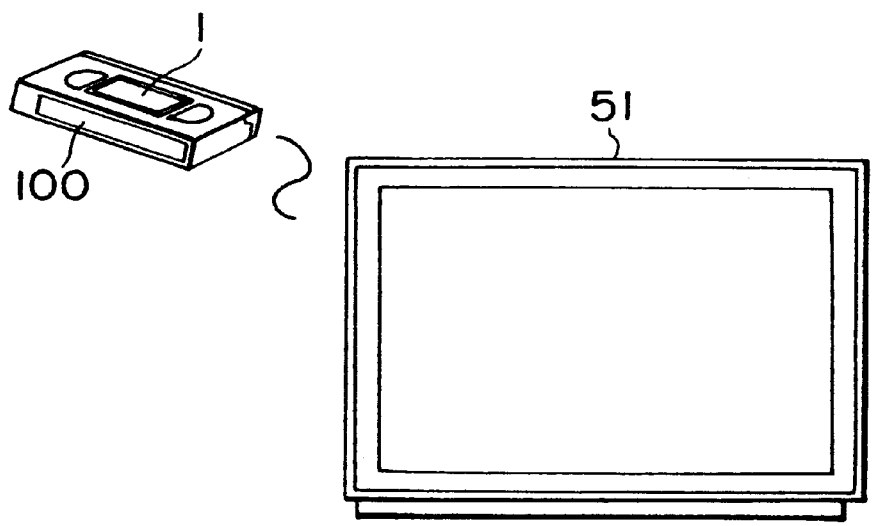
FIG. 5 is a diagram showing a typical application of a reader/writer to a television receiver.

FIG. 5 is a diagram showing an example in which communication can be established between a cassette 100 and a television receiver 51. In this example, the television receiver 51 is provided with a reader/writer 21 shown in FIG. 2. The reader/writer 21 is installed on the television receiver 51 so that the antenna 22 of the reader/writer 21 is directed to the outside of the television receiver 51. In this way, communication can be established between the memory card 1 mounted on the cassette 100 and the reader/writer 21 installed on television receiver 51, allowing the reader/writer 21 to read out data stored in the memory card 1. The data read out from the memory card 1 is then supplied to the television receiver 51 to be displayed on a screen thereof. Conversely, predetermined data can be transmitted to the memory card 1 to be stored therein.

Figure 6:
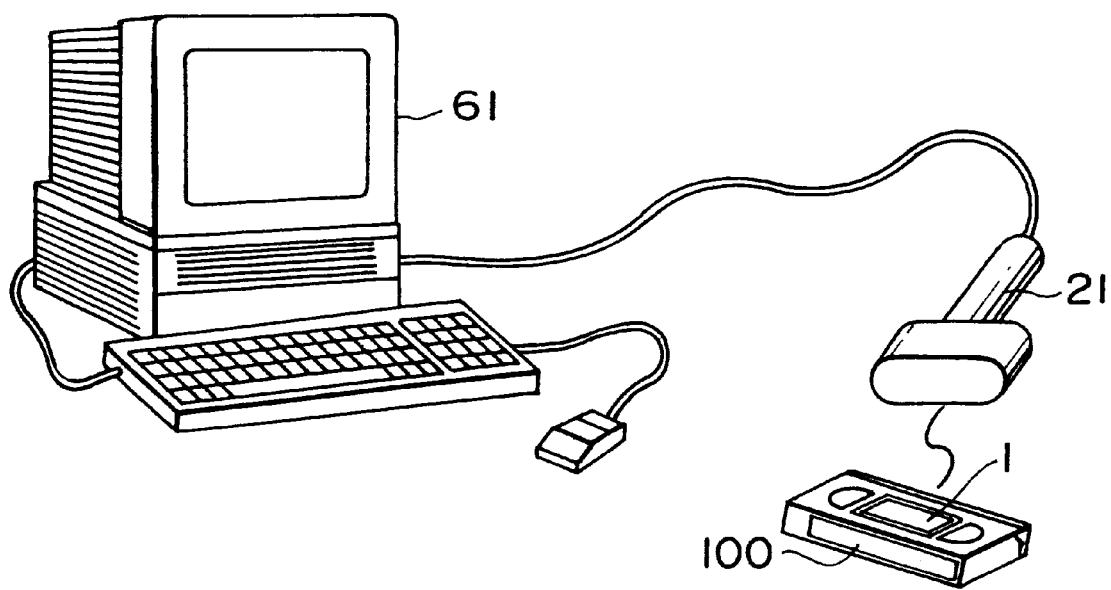
FIG. 6 is a diagram showing a typical application of a reader/writer to a personal computer.

FIG. 6 is a diagram showing a state in which a reader/writer 21 shown in FIG. 2 is connected to a personal computer 61, referred to hereafter simply as a PC 61, allowing the PC 61 to read out and to write data from and to a memory card 1 mounted on a cassette 100. In this example, the reader/writer 21 is controlled by the PC 61 which issues instructions to the PC 61 to read out and to write data from and to the memory card 1.

Figure 7:
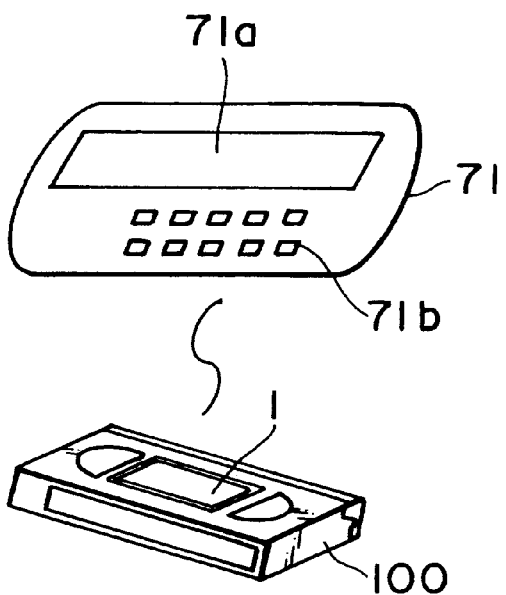
FIG. 7 is a diagram showing a typical application of a reader/writer to a remote commander.

FIG. 7 is a diagram showing a state in which a reader/writer 21 shown in FIG. 2 is provided on a remote commander or a display apparatus 71. As shown in the figure, the remote commander or the display apparatus 71 is provided with a display unit 71a which is capable of displaying information such as characters and a graphic, allowing data read out from a memory card 1 to be displayed thereon. An operation unit 71b is operated to transmit data to the memory card 1 to be stored therein.

Figure 8:
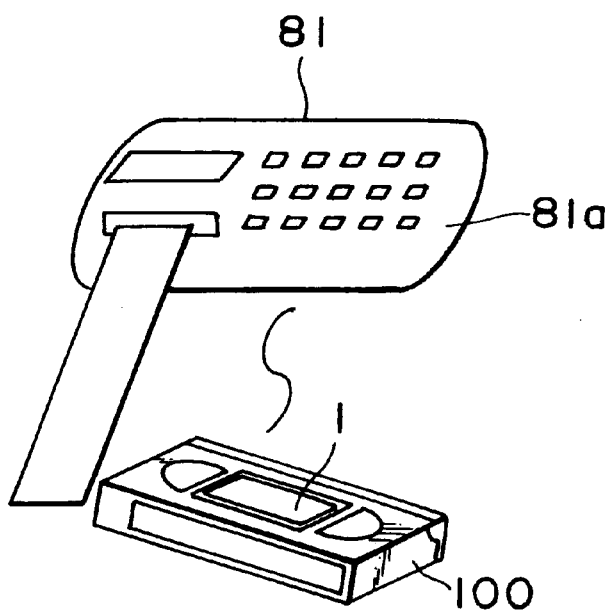
FIG. 8 is a diagram showing a typical application of a reader/writer to a printer.

FIG. 8 is a diagram showing a state in which a reader/writer 21 shown in FIG. 2 is provided on a printer 81. In this case, the printer 81 is capable of communicating with a memory card 1 mounted on a cassette 100, reading out data stored in the memory card 1 and printing the data on a predetermined piece of paper. The paper can then be stuck to the cassette as an index card. In addition, by operating an operation unit 81a, data can be entered and transmitted to the memory card 1 to be stored therein.

FIG. 9 is a block diagram showing a typical internal configuration of the VTR 41 shown in FIG. 4. In this example, the reader/writer 21 has a plurality of antennas 22-1 and 22-2. A microcomputer 95 controls the reader/writer 21 through a communication line 32, exchanges data with the reader/writer 21, reads out data stored in a memory card 1 mounted on a cassette 100 and transmits data to the memory card 1 to be stored therein.

A compartment 93 forms a space for accommodating a cassette 100. A switch 94 is used for detecting whether or not a cassette 100 has been inserted into the compartment 93. The antenna 22-2 for communicating with a memory card 1 mounted on a cassette 100 existing outside the VTR 41 is designed to provide extremely high directivity to an electric wave radiated thereby, that is, directivity that does not have an effect on internal components of the VTR 41. To put it concretely, a metallic plate 92-2 is provided on the back surface of the antenna 22-2 to prevent an electric wave radiated by the antenna 22-2 from being directed to the inside of the VTR 41.

By the same token, a metallic plate 92-1 is provided on the back surface of the antenna 22-1 to prevent an electric wave radiated by the antenna 22-1 from being directed to the inside of the VTR 41.

Normally, with a cassette 100 inserted into the compartment 93 in the VTR 41, the antenna 22-1 provided on the compartment 93 allows communication to be established with a memory card 1 mounted on the cassette 100.

As described above, communication is established with a memory card 1 mounted on the cassette 100 inserted into the compartment 93 under a condition that imposes a limitation on the intensity of an electric field based on safety standards conforming to an electric-wave law or the like, hence, limiting a distance reachable by a radiated electric wave. With a cassette 100 not inserted into the compartment 93, the strength of an electric wave radiated by the antenna 92-1 is not enough for reaching the cassette 100. As a result, in the case of a cassette 100 existing outside the VTR 41, communication with a memory card 1 mounted on the cassette 100 can not be established with a high degree of reliability.

In order to solve the problem described above, the antenna 22-2 is further provided typically on the front surface of the VTR 41 shown in FIG. 9 in addition to the antenna 22-1. As a result, even in the case of a cassette 100 existing outside the VTR 41, the reader/writer 21 is capable of communicating with a memory card 1 mounted on the cassette 100 through the antenna 22-2 with a high degree of reliability.

As described above, the switch 94 is used for forming a judgment as to whether a cassette 100 exists in the inside or the outside of the VTR 41. More specifically, when a cassette 100 is inserted into the compartment 93, the switch 94 is pushed by the case of the cassette 100, detecting the insertion of the cassette 100 into the compartment 93. At that time, a signal indicating the insertion of the cassette 100 into the compartment 93 is supplied to the microcomputer 95 from the switch 94. In this way, the microcomputer 95 is capable of forming a judgment as to whether a cassette 100 exists in the inside or the outside of the VTR 41.

Informed by the signal from the switch 94 that a cassette 100 has been inserted into the compartment 93, the microcomputer 95 operates the antenna 22-1 to establish communication with the cassette 100 inserted into the compartment 93 through the antenna 22-1.

When it is necessary to update data stored in a memory card 1 mounted on the cassette 100 inserted into the compartment 93, the data stored in the memory card 1 is updated in a batch operation when the cassette 100 is ejected from the VTR 41. This is because communication between a reader/writer 21 installed in the VTR 41 and the memory card 1 mounted on the cassette 100 is carried out by using a carrier in the short to intermediate wavelength band. By updating the data stored in the memory card 1 in a batch operation when the cassette 100 is ejected from the VTR 41, the magnitude of an effect of the carrier on video and audio processing circuits in the VTR 41 can be reduced to a minimum.

In addition, in order to lengthen the reachable distance of communication, the memory card 1 can be provided with an antenna 111 for supplying power thereto besides the antenna 2 for communication as shown in FIG. 10. This is because the antenna for communication requires a pass band to a certain degree in order to assure a predetermined transmission speed, making it impossible to increase the Q of the communication antenna where the Q is defined as a ratio of the center frequency of a tuning circuit to the effective band width. As a result, the level of a carrier received by the communication antenna for delivering power becomes lower as the distance increases, making it no longer possible to assure enough power for the communication. On the other hand, an antenna for supplying power can have a Q high enough for fetching a high carrier level, hence, being capable of delivering required power even for a long communication distance. As a result, the communication distance can be lengthened.

In the memory card 1 shown in FIG. 10, a carrier received by the antenna 111 is supplied to a tuning circuit 112. Unlike the tuning circuit 3 for communication purposes, however, the tuning circuit 112 is designed to give a Q as high as possible so that the power extracted thereby can be increased to a maximum. As a result, the reception level of the carrier can be raised, improving the efficiency of the power conversion.

Figures 11, 12:
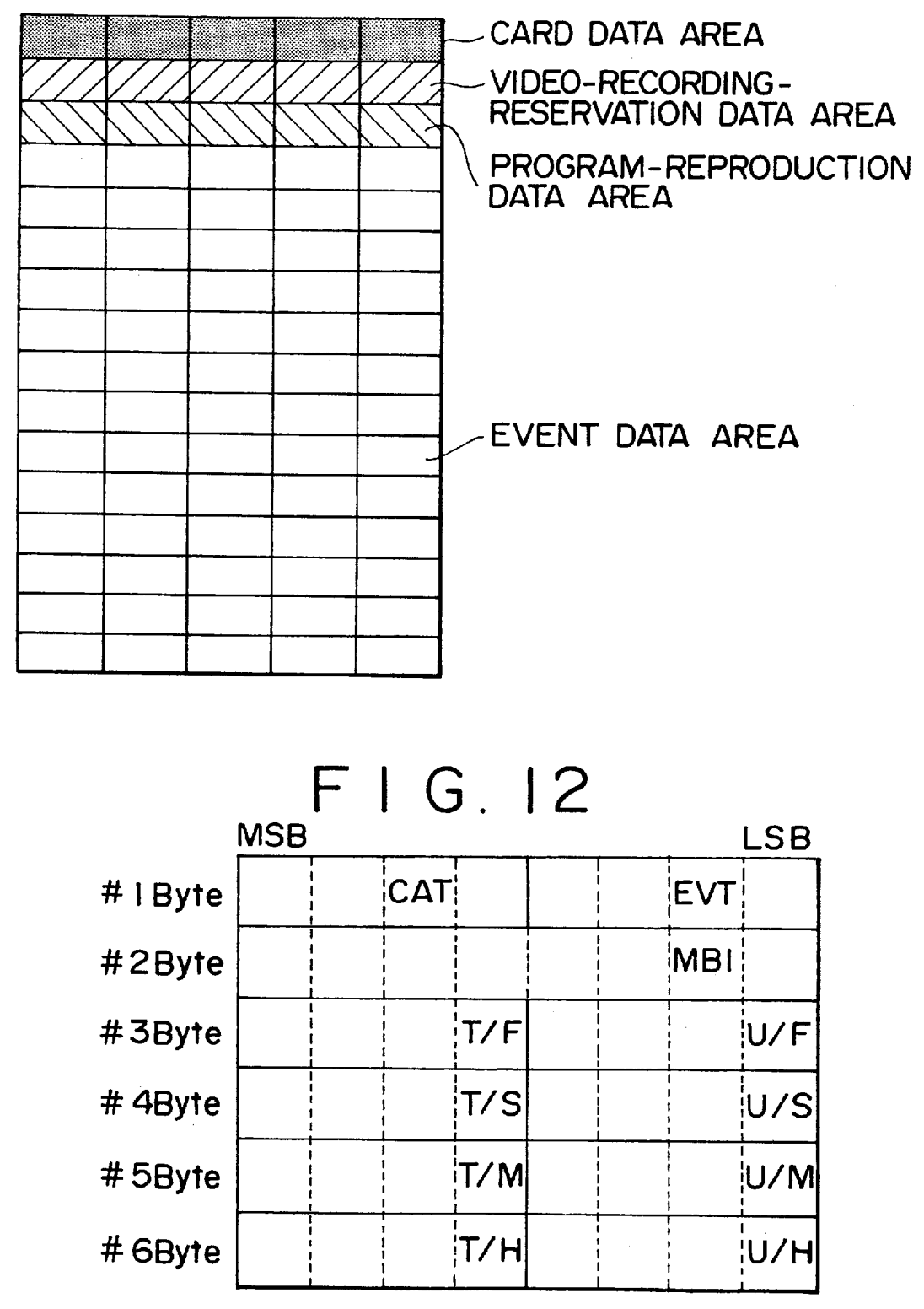

FIG. 11 is a diagram showing a typical structure of data stored in the memory unit of the memory card 1, that is, the EEPROM unit 9. As shown in the figure, the storage area of the memory card 1 comprises a card data area, a video-recording-reservation data area, a program-reproduction data area and an event data area. The card data area is used for storing intrinsic information of the cassette 100.

FIG. 12 is a diagram showing a typical data structure of the card data area of the memory card. As shown in the figure, the card data area is used for recording, among other data, the following information:

1. CAT (Category): category information indicating the application of the cassette 10.
2. EVT (Number of Events): the number of events stored in the event data area.
3. MB1 (Number of Memory Banks): information on the storage capacity of the memory unit.
4. T/F (Tens of Frame, the ten digit of a frame number): part of information on the current position in the cassette 100.
5. U/F (Units of Frame, the least significant digit of the frame number): part of the information on the current position in the cassette 100.
6. T/S (Tens of Second, the ten digit of the number of seconds): part of the information on the current position in the cassette 100.
7. U/S (Units of Second, the least significant digit of the number of seconds): part of the information on the current position in the cassette 100.
8. T/M (Tens of Minute, the ten digit of the number of minutes): part of the information on the current position in the cassette 100.
9. U/M (Units of Minute, the least significant digit of the number of minutes): part of the information on the current position in the cassette 100.
10. T/H (Tens of Hour, the ten digit of the number of hours): part of the information on the current position in the cassette 100.
11. U/H (Units of Hour, the least significant digit of the number of hours): part of the information on the current position in the cassette 100.

The category information indicates the type of the application such as a consumer application, a business application or another application. Depending upon the category information, the entire memory structure and data allocation can be changed. The following is description given on the assumption that data is stored in the memory for category information indicating a consumer application, that is, description of a structure of allocation of memory for a consumer application.

As information on the current position, data representing a halt position of the cassette 100 is stored. For example, data representing the time that has lapsed since the start of an operation to reproduce data is stored in terms of hours, minutes, seconds and frames. Accordingly, when a cassette 100 is mounted on the VTR 41 after being taken off once from the VTR 41, the current position of the cassette 100 can be displayed instantaneously. As a result, the operability of the VTR 41 can be improved.

When an operation such as reproduction of information from a cassette 100 is carried out by using another VTR provided with no reader/writer 21, for example, the current position will be changed without updating the information on the current position stored in the memory card. In case comparison of the information on the current position stored in the memory card 1 with information on the current position detected by another means indicates a difference between the two, an attempt will be made to store the detected information on the halted position into the memory card 1. In this way, the information on the current position stored in the memory card 1 can be updated with information on the current position representing the actual position.

The current position of the cassette can be detected by adopting the following method. For example, data is reproduced from the cassette 100 and the current position can be found from the rotational speed of a reel motor. As an alternative, the current position can be recognized by reproducing information on the current position written at specific positions. In particular, in the case of a video apparatus, positional counter information inserted into the intervals of a vertical-synchronization signal can be used.

Figure 13:
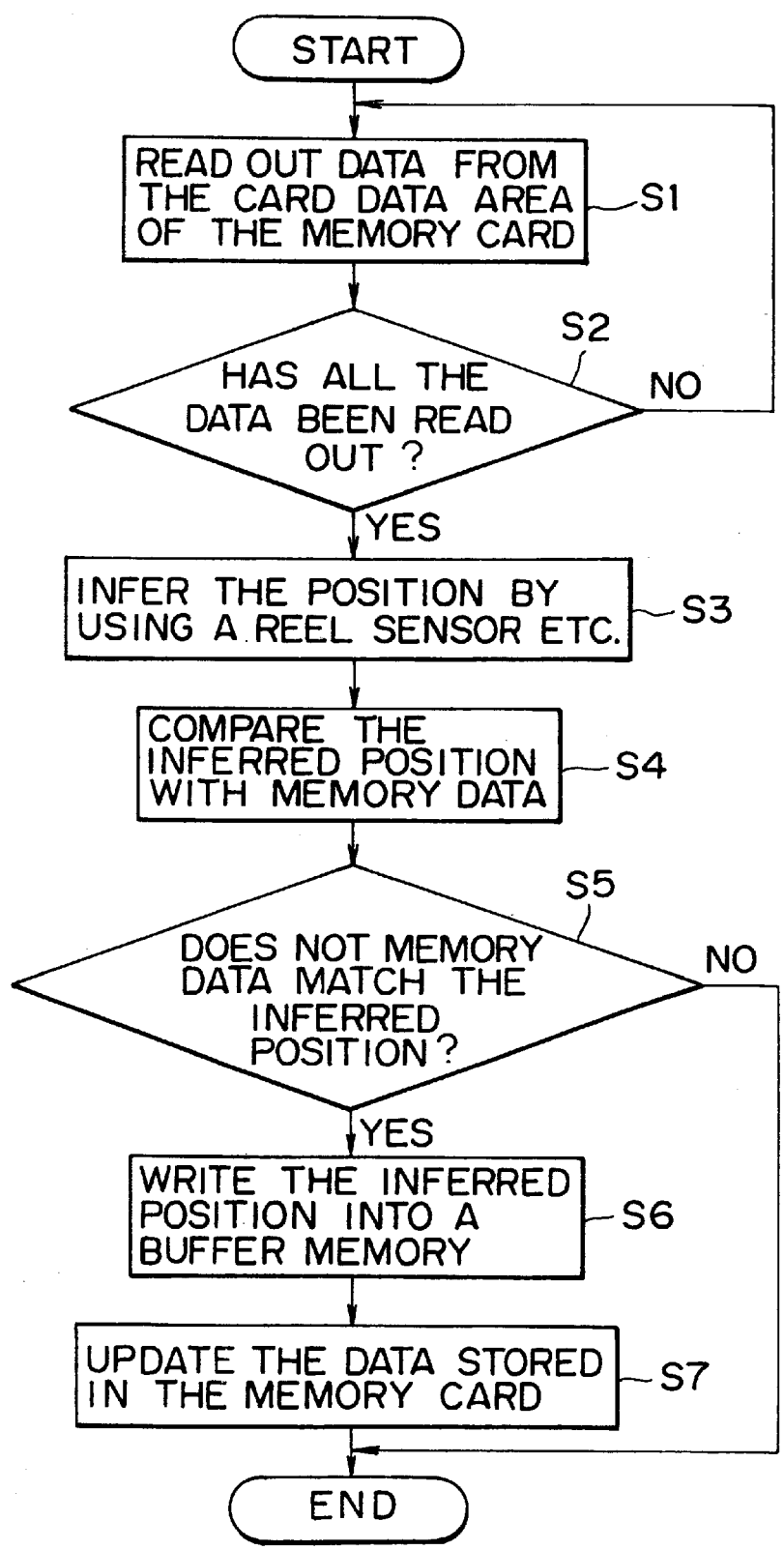
FIG. 13 is a flowchart used for explaining a procedure of processing to update information stored in the card data area.

The following is description of a procedure of processing which is carried out by the microcomputer 95 in case information on the current position of a cassette 100 stored in the card data area of the memory card 1 does not agree with the actual halted position with reference to a flowchart shown in FIG. 13. As shown in the figure, the flowchart begins with a step S1 at which the microcomputer 95 issues a command to the reader/writer 21 by way of a communication line 32, requesting the reader/writer 21 to read out information on the current position stored in the card data area of the memory card 1 mounted on the cassette 100.

In accordance with the command received from the microcomputer 95, the reader/writer 21 reads out information on the current position stored in the card data area of the memory card 1 mounted on the cassette 100 through the antenna 22-1. The flow of processing then goes on to a step S2 to form a judgment as to whether or not the information on the current position has all been read out by a microcomputer 27 employed in the reader/writer 21. If the information on the current position has not all been read out, the flow of processing returns to the step S1 to repeat the pieces of processing carried out at the steps S1 and S2 till the information on the current position is all read out. If the information on the current position has all been read out, on the other hand, the flow of processing proceeds to a step S3. At that time, the information on the current position read out from the memory card 1 is supplied to the microcomputer 95 by way of the communication line 32.

At the step S3, an operation such as reproduction of data is carried out under the control of the microcomputer 95. From the rotational speed of the reel motor, the microcomputer 95 infers the current halted position of the cassette 100. The flow of processing then continues to a step S4 at which the inferred value of the current position is compared with the information on the current position stored in the memory card 1 and supplied to the microcomputer 95 by the reader/writer 21.

Then, the flow of processing goes on to a step S5 to form a judgment as to whether or not the inferred value of the current position agrees with the information on the current position stored in the memory card 1 or whether or not the difference between the two is within a predetermined range of errors. If the inferred value of the current position does not agree with the information on the current position stored in the memory card 1, the actual current position is judged to have been changed in a reproduction operation or the like carried out by another VTR without updating the information on the current position stored in the memory card 1 mounted on the cassette 100. In this case, the flow of processing proceeds to a step S6 at which the information on the current position inferred at the step S3 is written into a predetermined buffer memory. The flow of processing then continues to a step S7 at which the presently inferred current position is finally regarded as valid data representing the actual current position and the information on the current position stored in the memory card 1 is updated with the inferred value of the present position written in the buffer memory to complete the processing. If the outcome of the judgment formed at the step S5 indicates that the inferred value of the current position agrees with the information on the current position stored in the memory card 1, on the other hand, the information on the current position stored in the memory card 1 is regarded as correct information. In this case, the processing is completed without updating the information on the current position stored in the memory card 1.

FIG. 14 is a diagram showing a typical data structure of the video-recording-reservation data area shown in FIG. 11. The video-recording-reservation data area is used for storing information on a timer-based video-recording reservation. The microcomputer 95 employed in the VTR 41 reads in the information on a timer-based video-recording reservation through the reader/writer 21, comparing the information with the present time and date. If the information on a timer-based video-recording reservation is found valid, the microcomputer 95 sets the information in a timer circuit not shown in the figure, putting the VTR 41 in a video-recording reservation state. This function is simpler than the ordinary video-recording-reservation function which is executed by the user by operating the VTR 41 or a remote commander. This function is yet convenient for repeatedly recording an event such as a regular daily program.

As shown in FIG. 14, the video-recording-reservation data area is used for storing data required for making a timer-based video-recording reservation including:
1. Recording speed (SR=1 indicating an SP (Short Play) or SR=0 indicating an LP (Long Play))
2. Day of the week (Day)
3. Information on protection (RP) indicating whether or not a write operation is inhibited (RP=0 indicating record protection or RP=1 indicating no record protection)
4. Timer control flag (TCF) indicating the frequency of control such as one-time control, daily control or weekly control. For example, TCF=00 indicates weekly control, TCF=01 indicates one-time control and TCF=11 indicates daily control.
5. video-recording time and date
    5.1 T/BM (Tens of Start Minute) representing the ten digit of the minute portion of the video-recording start time.
    5.2 U/BM (Units of Start Minute) representing the least significant digit of the minute portion of the video-recording start time.
    5.3 T/BH (Tens of Start Hour) representing the ten digit of the hour portion of the video-recording start time.
    5.4 U/BH (Units of Start Hour) representing the least significant digit of the hour portion of the video-recording start time.
    5.5 T/EM (Tens of End Minute) representing the ten digit of the minute portion of the video-recording end time.
    5.6 U/EM (Units of End Minute) representing the least significant digit of the minute portion of the video-recording end time.
    5.7 T/EH (Tens of End Hour) representing the ten digit of the hour portion of the video-recording end time.
    5.8 U/EH (Units of End Hour) representing the least significant digit of the hour portion of the video-recording end time.
    5.9 T/D (Tens of Day) representing the ten digit of the day portion of the video-recording date.
    5.10 U/D (Units of Day) representing the least significant digit of the day portion of the video-recording date.
    5.11 T/M (Tens of Month) representing the ten digit of the month portion of the video-recording date. TM=1 indicating the months of October to December.
    5.12 U/M (Units of Month) representing the least significant digit of the month portion of the video-recording date. U/M=0 to 9 indicating the months of January to September respectively.
    5.13 T/Y (Tens of Year) representing the ten digit of the year portion of the video-recording date.
    5.14 U/Y (Units of Year) representing the least significant digit of the year portion of the video-recording date.
6. Broadcasting station ID (ID=Station ID/Position)
7. SEL (Input Select) representing input switching information of the VTR 41
8. CHR (Station ID1 to ID5)

The above pieces of information are converted into data with a format for the video-recording-reservation function of the VTR 41.

Figure 15:
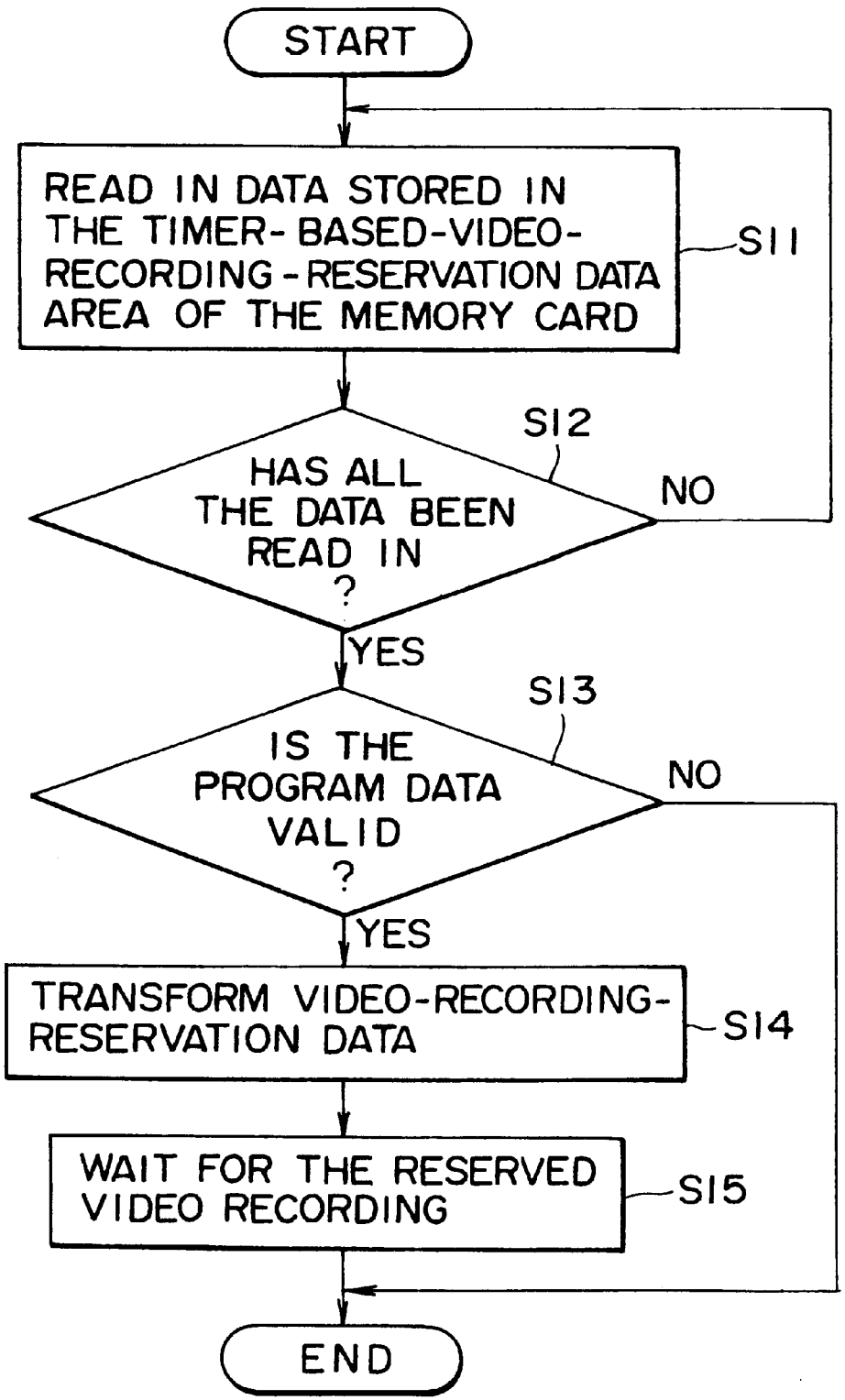
FIG. 15 shows a flowchart representing a procedure of processing based on information on a timer-based-video-recording reservation stored in a memory card.

FIG. 15 shows a flowchart representing a procedure of processing carried out by the microcomputer 95 to execute the video-recording-reservation function based on information on a video-recording reservation stored in the video-recording reservation data area of a memory card 1 mounted on a cassette 100. As shown in the figure, the flowchart begins with a step S11 at which the microcomputer 95 reads in data stored in the video-recording reservation data area of the memory card 1 mounted on the cassette 100. To put it in detail, the microcomputer 95 issues a command to the reader/writer 21 through the communication line 32, requesting the reader/writer 21 to read out the information on a timer-based video-recording reservation stored the video-recording-reservation data area of the memory card 1 mounted on the cassette 100.

In accordance with the command received from the microcomputer 95, the reader/writer 21 reads out the information on a timer-based video-recording reservation, that is, video-recording-reservation data, from the video-recording-reservation data area of the memory card 1 through the antenna 22-1. The flow of processing then goes on to a step S12 to form a judgment as to whether or not the video-recording reservation data, that is, program data, has all been read out by a microcomputer 27 employed in the reader/writer 21. If the video-recording-reservation data has not all been read out, the flow of processing returns to the step S11 to repeat the pieces of processing carried out at the steps S11 and S12 till the video-recording-reservation data is all read out. If the video-recording-reservation data has all been read out, on the other hand, the flow of processing proceeds to a step S13.

At the step S13, the video-recording-reservation data read out by the microcomputer 27 is checked to form a judgment as to whether the data is valid or invalid. To put it in detail, the data is checked, for example, to form a judgment as to whether or not the broadcasting start time of a program reserved for video recording is a time after the present time or, if the broadcasting start time of a program reserved for video recording is a time after the present time, the start time is within 24 hours after the present time. If the outcome of the judgment indicates that the video-recording-reservation data is valid, the flow of processing proceeds to a step S14 at which the video-recording reservation data is transformed into video-recording-reservation data with a format that can be processed by the microcomputer 95 employed in the VTR 41.

The flow of processing then continues to a step S15 at which the VTR 41 enters a state to wait for the reserved video recording, terminating the processing. If the outcome of the judgment formed at the step S13 indicates that the video-recording-reservation data is invalid, on the other hand, the processing is terminated.

Since a video-recording reservation can be made in accordance with video-recording-reservation data recorded in advance in the video-recording-reservation data area of a memory card 1 mounted on a cassette 100 as described above, in order to record a program broadcasted at a predetermined time every week, for example, the user needs only to set the cassette 100, which has a memory card 1 with the video-recording-reservation data of the program stored therein, in the VTR 41. In this way, the program can be recorded.

In addition, by mounting a purchased memory card 1, on which video-recording-reservation data of a program has been recorded in advance, on a cassette, the user is capable of making a video-recording reservation of the program without the need to enter video-recording-reservation data of the program.

Figure 16:
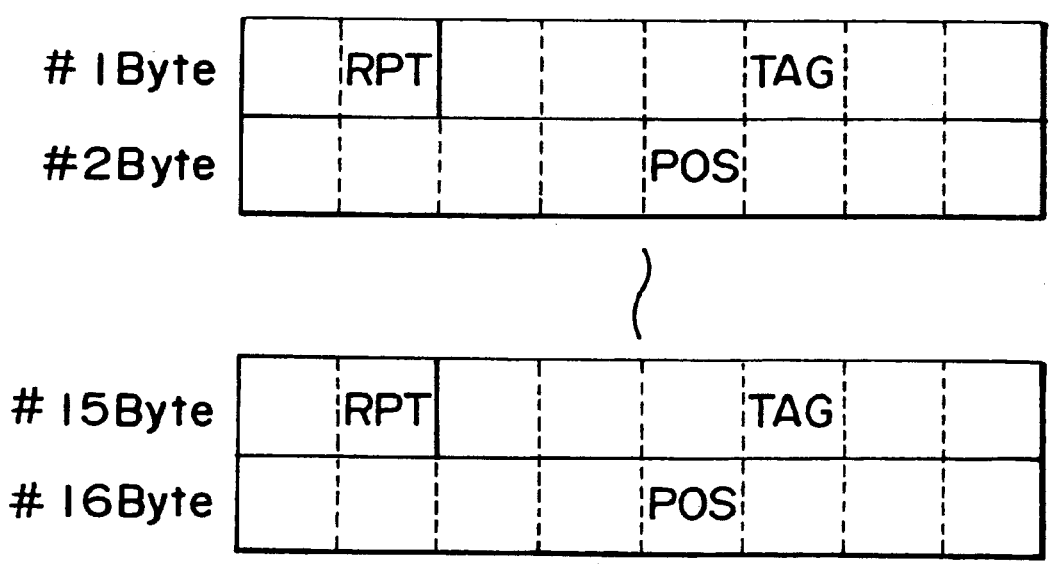
FIG. 16 is a diagram showing a typical data structure of a program-reproduction data area shown in FIG. 11.

FIG. 16 is a diagram showing a typical data structure of a program-reproduction data area of the memory card 1 shown in FIG. 11. The program-reproduction data area is used for recording data for an automatic reproduction. An RPT (Repeat Play) field shown in the figure is a two-bit field used for recording data representing a reproduction mode such as a one-time reproduction operation, a two-time reproduction operation and a repeated reproduction operation. A TAG (operation bit) field is a six-bit field used for recording data regarding the operation specification of an area in which a program is recorded. Examples of the operation specification are a normal reproduction operation and a slow reproduction operation. A POS (Program Relative Position) field is an eight-bit field used for recording relative-position data indicating a reproduction position of the cassette 100 from which a reproduction operation is to be started.

The microcomputer 95 employed in the VTR 41 reads out data recorded in the program-reproduction data area of the memory card 1 mounted on the cassette 100, using the data for controlling other elements in an automatic reproduction operation.

Figure 17:
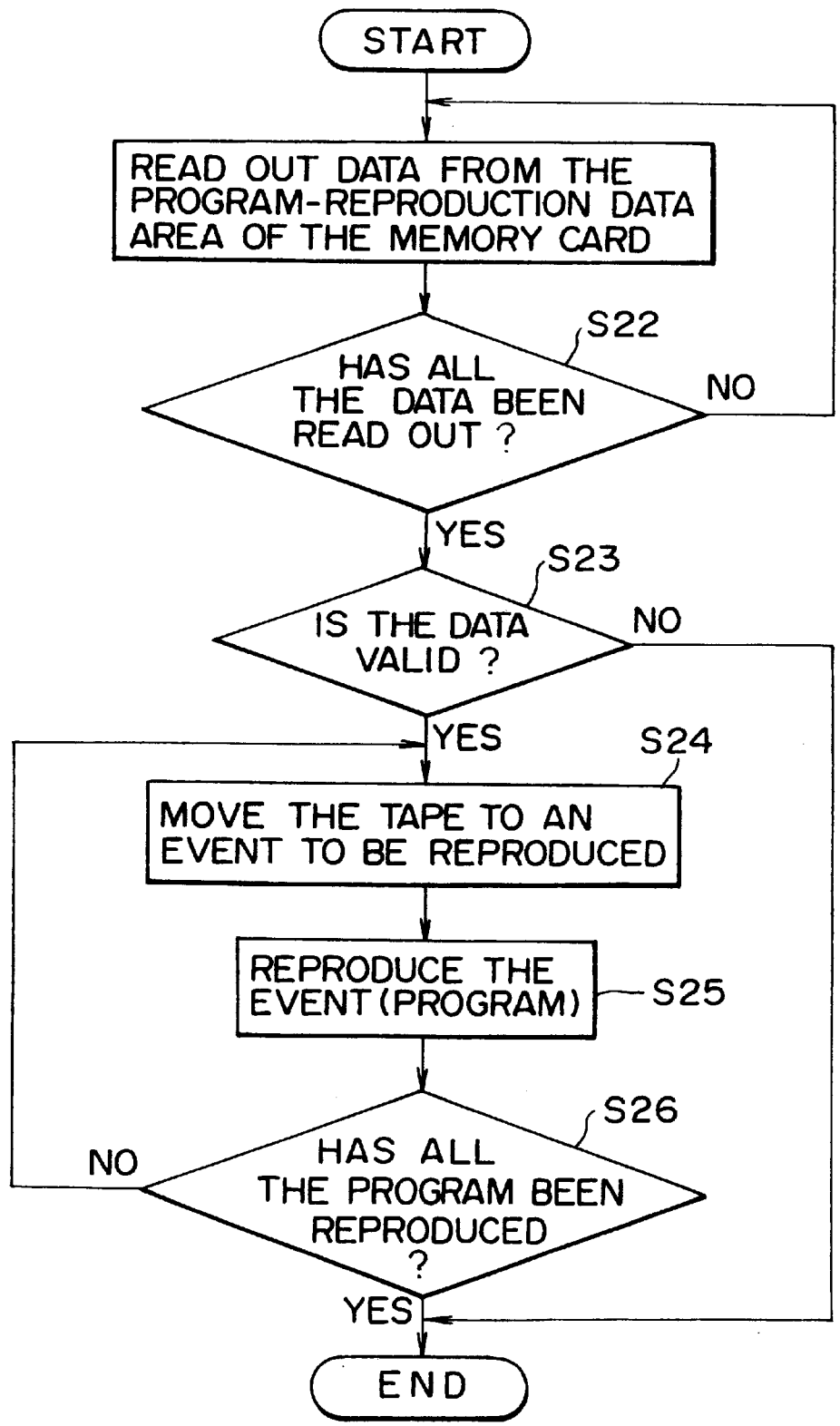
FIG. 17 shows a flowchart representing a procedure of processing to reproduce data in accordance with information on reproduction of a program stored in a memory card.

FIG. 17 shows a flowchart representing the procedure of processing carried out by the microcomputer 95 in an automatic reproduction operation. AS shown in the figure, the flowchart begins with a step S21 at which data recorded in the program-reproduction data area of the memory card 1 mounted on the cassette 100 is read out. That is to say, the microcomputer 95 issues a command to the reader/writer 21 by way of the communication line 32, requesting the reader/writer 21 to read out the data recorded in the program-reproduction data area of the memory card 1 mounted on the cassette 100.

In accordance with the command received from the microcomputer 95, the reader/writer 21 reads out program-reproduction data recorded in the program-reproduction data area of the memory card 1 mounted on the cassette 100 through the antenna 22-1. The flow of processing then goes on to a step S22 to form a judgment as to whether or not all the program-reproduction data has been read out from the program-reproduction data area by the microcomputer 27 employed in the reader/writer 21. If all the program-reproduction data has not been read out, the flow of processing returns to the step S21 at which the microcomputer 27 repeats the operation to read out the data till all the program-reproduction data is read out from the program-reproduction data area. If all the program-reproduction data has been read out from the program-reproduction data area, on the other hand, the flow of processing continues to a step S23.

At the step S23, the program-reproduction data read out by the microcomputer 27 is checked to form a judgment as to whether the program-reproduction data read is valid or invalid, that is, to form a judgment as to whether or not the format and other attributes of the data are correct. If the program-reproduction data read out by the microcomputer 27 is found valid, the flow of processing proceeds to a step S24 at which the head of the VTR 41 is moved to an initial reproduction position specified in the program-reproduction data read out by the microcomputer 27 at the step 21 by feeding the tape of the cassette 100 at a high speed or rewinding it. It should be noted that the head itself is not shown in the figure. The flow of processing then goes on to a step S25 at which recorded data specified in the program-reproduction data is reproduced.

Subsequently, the flow of processing proceeds to a step S26 to form a judgment as to whether or not the last piece of the program-reproduction data has been processed. If the last piece of the program-reproduction data has not been processed, the flow of processing returns to the step S24 to repeat the processing starting from the step S24. If the last piece of the program-reproduction data has been processed, on the other hand, the processing is ended.

If the program-reproduction data read out by the microcomputer 27 at the step S21 is found invalid at the step S23, on the other hand, the processing is ended without carrying out anything.

By recording a reproduction procedure in the program-reproduction data area of a memory card 1 in advance as described above, a reproduction operation can be carried out in accordance with the procedure. Such a reproduction procedure is used typically in editing work. In addition, similar processing can be carried out even if absolute position data is recorded in the data POS field of the program-reproduction data area.

FIG. 18 is a diagram showing a typical data structure of an event data area of the memory card 1 shown in FIG. 11. A RM (Record Mode) field shown in the figure is a two-bit field used for storing information on the recording mode such an image-only recording mode, a sound-only recording mode or an image-and-sound recording mode. A MIN field is a six-bit field used for recording the minute portion of a date and a time which is expressed in terms of hours, minutes and seconds. The broadcasting of a recorded program is started on the date and the time. A WEEK field is a three-bit field for recording a day of the week of the date. An HOUR field is a five-bit field for recording the hour portion of the time. A YR field is a seven-bit field comprising three high-order bits and four low-order bit for recording the year portion of the date. A DAY field is a five-bit field for storing the day portion of the date. Finally, a MTH field is a four-bit field for storing the month portion of the date.

The ID (Station ID) field is used for recording the ID of a broadcasting station. A SEL (Input Select) field is used for recording a selected input method. CHR (Station ID1–ID5) fields are each used for recording a string of characters of typically the name of a broadcasting station. There are five CHR fields corresponding to station ID1 to station ID5. A SR (Recording Speed) field is used for recording a video-recording speed. A RP (Record Protect) field is used for recording information as to whether a write operation is inhibited or enabled. A (CHN Audio CH No.) field is a two-bit field for recording the number of audio channels. An AMD (Audio Mode) field is a four-bit field for recording an audio mode such as a stereo mode or an audio multiplexing mode. A VEF (Video Emphasis) field and an AEF (Audio Emphasis) field are each a 1-bit field for recording information on a reproduction method depending on the tape such a reproduction method suitable for a rental cassette tape.

An N/C (Video System) field is a one-bit field used for recording data indicating a television broadcasting system such as PAL or NTSC. A STY (Set Up Data) field is a five-bit field used for recording data indicating a recording system such as a VHS or a SVHS. A KY (Key Information) field and a KYO field are each a four-bit field used for recording a lock key for the program. In the case of the example, the fields represent a two-digit lock key. For example, a recorded program may be intended only for certain individuals in which case a minor lock key, that is, a lock key for preventing persons under age from watching the program, is required. In this way, each program can be provided with a lock key (a password) set for a certain individual.

A TXT (Title Exists) field is a one-bit field for recording data indicating whether or not the title of a program is recorded. A BCT (Basic Category) field, a three-bit field, and a CNT (Category Contents) field, a four-bit field, are used for storing the category of a program. For example, data representing a sport category is recorded in the BCT field and data representing a baseball is recorded in the CNT. A TCO (Text Code) field is an eight-bit field used for recording data concerning the language of a program such Japanese or English.

An (Extended Data Bank) EBK field is an eight-bit field used for recording data for specifying an extension data area. An extension data area is used for recording a pointer pointing to an area in which information on a recorded program such as images and sound of the program is stored.

If the TXT field contains data which indicates that the title of a program is recorded, the next two blocks comprising 32 bytes are used for recording information on the title of the program. To be more specific, a TDP (Total Number of Text-Data Pieces) field is the first byte of the two blocks used for recording the number of text-data pieces in the title of the program. The next CHR (Character Code) fields of the subsequent bytes following the TDP byte in the two blocks are each an eight-bit field. The CHR fields are used for recording character codes of the title of the program.

By using the above pieces of information, an index to data recorded in the cassette 100 can be displayed on the display unit of the VTR 41 and the television receiver 42.

FIG. 19 shows a flowchart representing a procedure of processing which is carried out by the microcomputer 95 when most recent data is written over event data recorded earlier in the event data area of the memory card 1 mounted on the cassette 100. When a new program is recorded in a cassette 100 having a memory card 1 mounted thereon, for example, information on individual recorded programs stored in the memory card 1, that is, event data stored in the memory card 1, does not match event data stored temporarily in the VTR 41 any more. Therefore, when the cassette 100 is taken off from the VTR 41, data stored in the event data area of the memory card 1 mounted on the cassette 100 is updated.

Assume that a new program is recorded on a certain portion of the cassette 100 in which some programs (or events) have already been recorded. In this case, since the recorded contents of the portion are updated, a location in the event data area in the memory card 1 corresponding to the portion also needs to be updated.

As shown in FIG. 19, the flowchart begins with a step S31 at which the microcomputer 95 issues a command to the reader/writer 21 by way of the communication line 32, requesting the reader/writer 21 to read out the data recorded in the event data area of the memory card 1 mounted on the cassette 100.

In accordance with the command received from the microcomputer 95, the reader/writer 21 reads out event data recorded in the event data area of the memory card 1 mounted on the cassette 100 through the antenna 22-1. The flow of processing then goes on to a step S32 to form a judgment as to whether or not all the event data has been read out from the event data area by the microcomputer 27 employed in the reader/writer 21. If all the event data has not been read out, the flow of processing returns to the step S31 at which the microcomputer 27 repeats the operation to read out the data till all the event data is read out from the event data area.

If all the event data has been read out from the event data area, on the other hand, the flow of processing continues to a step S33. At the step S33, the event data read out from the memory card 1 at the step S31 as requested by the microcomputer 95 is compared with event data stored temporarily in the microcomputer 95. The flow of processing then proceeds to a step S34 to form a judgment as to whether or not the event data read out at the step S31 as requested by the microcomputer 95 matches the event data stored temporarily in the microcomputer 95. If the event data read out at the step S31 as requested by the microcomputer 95 does not match the event data stored temporarily in the microcomputer 95, the flow of processing continues to a step S35 at which the most recent event data stored in the microcomputer 95 is written into a buffer memory not shown in the figure. Then, the flow of processing goes on to a step S36 at which the most recent data stored in the buffer memory is used for updating the event data stored in the event data area of the memory card 1 corresponding to the most recent event data.

The flow of processing then proceeds to a step S37 to form a judgment as to whether or not the event data stored in the memory card 1 read out at the step S31 as requested by the microcomputer 95 matches the event data stored temporarily in the microcomputer 95 for a verification purpose.

In the VTR 41, event data for programs which are recorded in the cassette 100 after the cassette 100 is mounted on the VTR 41 is stored temporarily in the microcomputer 95. Therefore, when the cassette 100 is taken out from the VTR 41, the event data stored temporarily in the microcomputer 95 is copied to the event data area of the memory card 1 mounted on the cassette 100. If a new program is recorded in the cassette 100 over a program already existing therein, for example, the event data for the new program is written over the temporarily stored event data for the already existing program in the VTR 41. When the cassette 100 is taken out from the VTR 41, the most recent event data for the new program recorded in the cassette 100 is therefore recorded on the memory card 1 mounted on the cassette 100.

Event data stored in the memory card 1 includes information on the current position indicating a location in the cassette 100 at which a program associated with the event data is recorded. When a new program is recorded at a location on the cassette tape 100, the microcomputer 95 also includes information on the position in the event data for the new program stored temporarily therein.

If the outcome of the judgment formed at the step S37 indicates that the event stored in the memory card 1 does not match the event data stored temporarily in the microcomputer 95, the flow of processing returns to the step S35 to repeat pieces of processing at the step S35 and the subsequent steps. If the outcome of the judgment formed at the step S37 indicates that the event stored in the memory card 1 matches the event data stored temporarily in the microcomputer 95, on the other hand, the processing is completed. In addition, if the outcome of the judgment formed at the step S34 indicates that the event stored in the memory card 1 matches the event data stored temporarily in the microcomputer 95, on the other hand, the processing is completed.

As described above, when a new program is recorded in the cassette 100, changing the recorded contents of the cassette 100, information on the newly recorded program (or the event data) recorded in the memory card 1 is also updated accordingly.

Here, the title of a program can be obtained with ease by using an EPG (Electronic Program Guide) of broadcasted data inserted into the interval of the vertical-synchronization signal. If information on the title of a program can not be obtained, the title of a program included in event data recorded in the event data area of the memory card 1 can be edited by using external accessory equipment provided with a reader/writer.

When the VTR 41 is put in a video-recording state without entering the title of a program using an EPG etc., there is concern that the title of the program is not input. That is to say, since a video-recording reservation etc. is made by the user by utilizing a screen such as the EPG, information on a program such as the title of the program can be obtained beforehand. When carrying out ordinary video recording, however, information on a recorded program can not probably be obtained. In other words, since an EPG is supplied at time intervals of about five minutes to three hours, depending on the substance of the service, the title of a desired program can not be obtained in a real-time manner in some cases.

In order to solve the problem described above, information on a program such as the title of the program is inserted into the interval of the vertical-synchronization signal in synchronization with each program of the television broadcasting signal. Such information can be inserted regularly or at proper times such as the start or the end of a program. In this way, the title of a program can be supplied to the user. As a result, the user is capable of recording the title of a program in the memory card 1 mounted on the cassette 100, when necessary, by extracting the title.

In this way, information on a program such as the title of the program can be recorded in the memory card 1 even if ordinary video recording, that is, video recording not reserved by using an EPG screen, is carried out.

FIG. 20 is a block diagram showing a typical configuration of an embodiment implementing an information transmitting apparatus 111 provided by the present invention. A television-broadcast-signal outputting circuit 112 employed in the information transmitting apparatus 111 receives an audio signal of a program from a video camera or a VTR and a video signal from the video camera or the VTR by way of a multiplexing circuit 114, converting the signals into an output television-broadcast signal. A program-title generating circuit 113 generates a signal representing the title of a program, outputting the signal to the multiplexing circuit 114. The title of the program will be conveyed by the television-broadcast signal generated by the television-broadcast-signal outputting circuit 112.

The multiplexing circuit 114 inserts the signal representing the title of a program generated by the program-title generating circuit 113 into the interval of the vertical-synchronization signal of the video signal input by the information transmitting apparatus 111, multiplexing the signal representing the title of a program with the video signal and outputting the multiplexed signal to the television-broadcast-signal outputting circuit 112. A transmitting circuit 115 transmits the television-broadcast signal supplied thereto by the television-broadcast-signal outputting circuit 112. The television-broadcast signal output by the television-broadcast-signal outputting circuit 112 includes a multiplexed signal comprising the video signal and the signal representing the title of a program in addition to the audio signal.

For example, assume that video and audio signals of a program from a video camera or a VTR are supplied to the information transmitting apparatus 111. The video signal received by the information transmitting apparatus 111 is supplied to the multiplexing circuit 114 before being converted into a television-broadcast signal by the television-broadcast-signal outputting circuit 112. Let information on the title of a program conveyed by the video and audio signals received by the information transmitting apparatus 111 be supplied to the program-title generating circuit 113. The program-title generating circuit 113 generates a signal representing the title of the program from the information on the title of the program, supplying the signal to the multiplexing circuit 114.

The multiplexing circuit 114 inserts the signal representing the title of a program generated by the program-title generating circuit 113 into the interval of the vertical-synchronization signal of the video signal input by the information transmitting apparatus 111, superposing the signal representing the title of the program on the video signal. The video signal superposed with the title of the program is then supplied to the transmitting circuit 115 by way of the television-broadcast-signal outputting circuit 112. The television-broadcast signal output by the television-broadcast-signal outputting circuit 112 is used in the transmitting circuit 115 for modulating the frequency of a carrier prior to transmission.

FIG. 21 is a diagram showing a typical configuration of a VTR 121 wherein a television-broadcast signal with information such as the title of a program superposed in the interval of the vertical-synchronization signal thereof is supplied thereto from the information transmitting apparatus 111 shown in FIG. 20. As shown in the figure, the VTR 121 further includes a television-broadcast-signal receiving circuit 122 and a program-title extracting circuit 123 in addition of components composing the VTR 41 shown in FIG. 9.

The television-broadcast-signal receiving circuit 122 receives a television-broadcast signal transmitted by the transmitting circuit 115 employed in the information transmitting apparatus 111. The television-broadcast signal received by the television-broadcast-signal receiving circuit 122 is then forwarded to a program-title extracting circuit 123 described below and a recording/reproduction circuit which is not shown in the figure. The program-title extracting circuit 123 extracts a signal representing the title of a program superposed in the interval of the vertical-synchronization signal of the television-broadcast signal supplied thereto from the television-broadcast-signal receiving circuit 122, supplying the extracted signal to the microcomputer 95.

As described above, the television-broadcast signal transmitted by the transmitting circuit 115 employed in the information transmitting apparatus 111 received by the television-broadcast-signal receiving circuit 122 is forwarded to the program-title extracting circuit 123 and the recording/reproduction circuit. The program-title extracting circuit 123 then extracts a signal representing the title of a program superposed in the interval of the vertical-synchronization signal of the television-broadcast signal supplied thereto from the television-broadcast-signal receiving circuit 122, supplying data such as character codes of the title of the program to the microcomputer 95.

The microcomputer 95 supplies the data representing the title of the program supplied thereto to the reader/writer 21 by way of the communication line 21. The reader/writer 21 then writes the data representing the title of the program supplied thereto by the microcomputer 95 into the memory card 1 by way of the antenna 22-1 or 22-2.

Being the same as those of the VTR 41 shown in FIG. 9, the description of the remaining configuration and operations is not repeated here.

As described above, by inserting information such as the title of a program into a television-broadcast signal, unobtainable information such as the title of a program recorded by using even an EPG can now be obtained in an operation such as ordinary video recording. In addition, the obtained information can be stored in the memory card 1.

In addition, by using a PC 61 like the one shown in FIG. 6 for example, the title of a program which is obtained by the user by reading out a program guide from a publication such as a newspaper or a magazine can be recorded in a memory card 1 mounted on a cassette 100 by way of the reader/writer 21 connected to the PC 61. As an alternative, by connecting the PC 61 to an external data base through a wire connection such as a telephone line, the title of a program can be acquired from the data base and recorded in the memory card 1 by way of the reader/writer 21. As another alternative, the title of a program can be obtained from a program guide described in an electronic publication such as a CD-ROM and recorded in the memory card 1. As a further alternative, the title of a program supplied through means such as an XDS (Extended Data Service), a PDS (Program Delivery Service) or a character multiplexing broadcast system can be acquired and recorded in the memory card 1.

In an operation such as video recording of a signal received by a satellite-broadcasting receiver, for example, the satellite-broadcasting receiver is connected to an external input terminal of the VTR 1 through which a base-band signal to be recorded is supplied. In this case, since the VTR 41 is not capable of obtaining desired information such as the title of a program to be recorded, the required data is re-inserted into the interval of the vertical-synchronization signal of a signal received by the satellite-broadcasting receiver and transmitted to the VTR 41 by way of a bus connecting the VTR 41 and the satellite-broadcasting receiver.

A program category is additional information for identifying the category and other data of a recorded program. A program category can be used for searching a recording medium such as a cassette tape for a desired program. An area appended as an extension data area is used for storing information pertaining to a recorded program such as video and audio data. By displaying images (video data) and outputting sound (audio data) stored in such an area in addition to characters, the display of contents recorded in a cassette can be made easy to understand.

Besides consumer applications described so far, applications of the memory card 1 also include business and preset-work applications. In a business application which includes a rental-business application, information stored in the memory card includes the title of a recorded program, the number of operations reproducing the program, information on a borrower of the cassette such as a member ID, a borrowing day and a borrowing period, not to mention other necessary information such as a static image, sound and character data.

Figure 22:
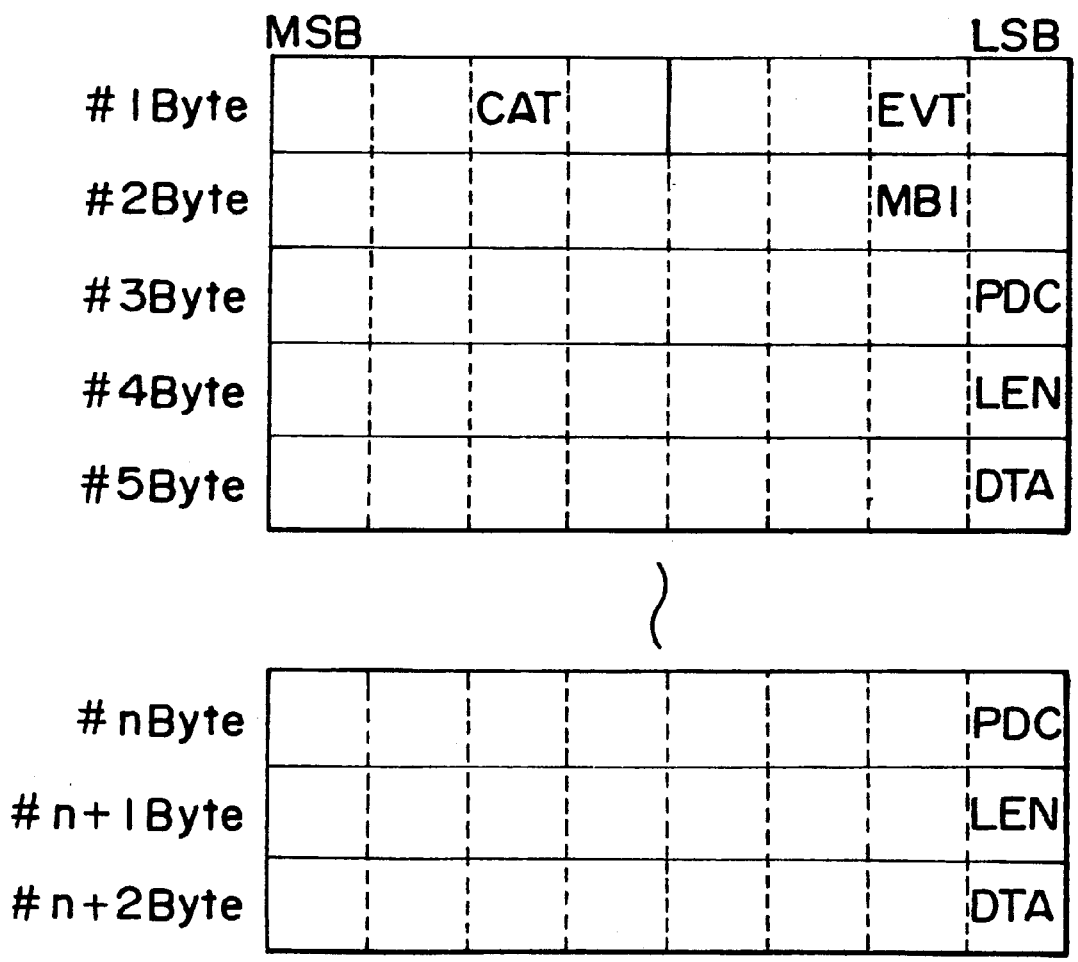
FIG. 22 is a diagram showing a typical data structure of information for a business application stored in a memory card.

FIG. 22 is a diagram showing a typical data structure of information for a business application stored in the memory card 1. A CAT (Category) field shown in the figure is a four-bit field used for recording information such as the title of a recorded program. An EVT (Number of Events) field is a four-bit field used for recording the number of events (programs). An MB1 field is an eight-bit field used for recording the storage capacity of the memory.

A PDC (Professional Data Category) field is an eight-bit field used for storing a category of information for a business application. A LEN (Professional Data Length) field is used for storing the data length of the information for a business application. A DTA (Professional Data) field is used for recording the information for a business application. The information for a business application includes the title of a recorded program, the number of operations reproducing the program and information on borrowers of the cassette such as a member ID, a borrowing day and a borrowing period. In addition, the information for a business application includes other necessary information such as a static image, sound and character data.

By using a memory card 1 of a business application as a member card, data to be recorded can be shared by the reader/writer 21 and the memory card 1. For example, information on a member stored in a member card can be supplied to the PC 61 by way of the reader/writer 21 and, on the other hand, information such as a borrowing date and a borrowing period entered to the PC 61 can be stored in the member card. In addition, the information on a member stored in a member card can be transferred to another memory card 1 of any cassette 100 with ease. As a result, control of customers and commodities can be executed with a high degree of efficiency.

In addition, the memory card 1 can be used for automatic installation of preset guide information. For example, channel numbers are set in accordance with an area in which the target apparatus such as the VTR is installed. In the case of the ordinary apparatus, the user carries out an operation to store such channel numbers in a preset memory. By using such a memory card 1 for automatic installation of preset guide information, however, the preset work to store such channel numbers in a preset memory can be done automatically. Thus, information recorded in a memory card 1 for automatic installation of preset guide information typically includes data required in initial setting of a recording/reproduction apparatus such as a VTR, a table containing tuner preset data, data for presetting a G-code area, information on a manufacturer of a CATV (cable television) cable box and other information on the recording/reproduction apparatus.

Figure 23:
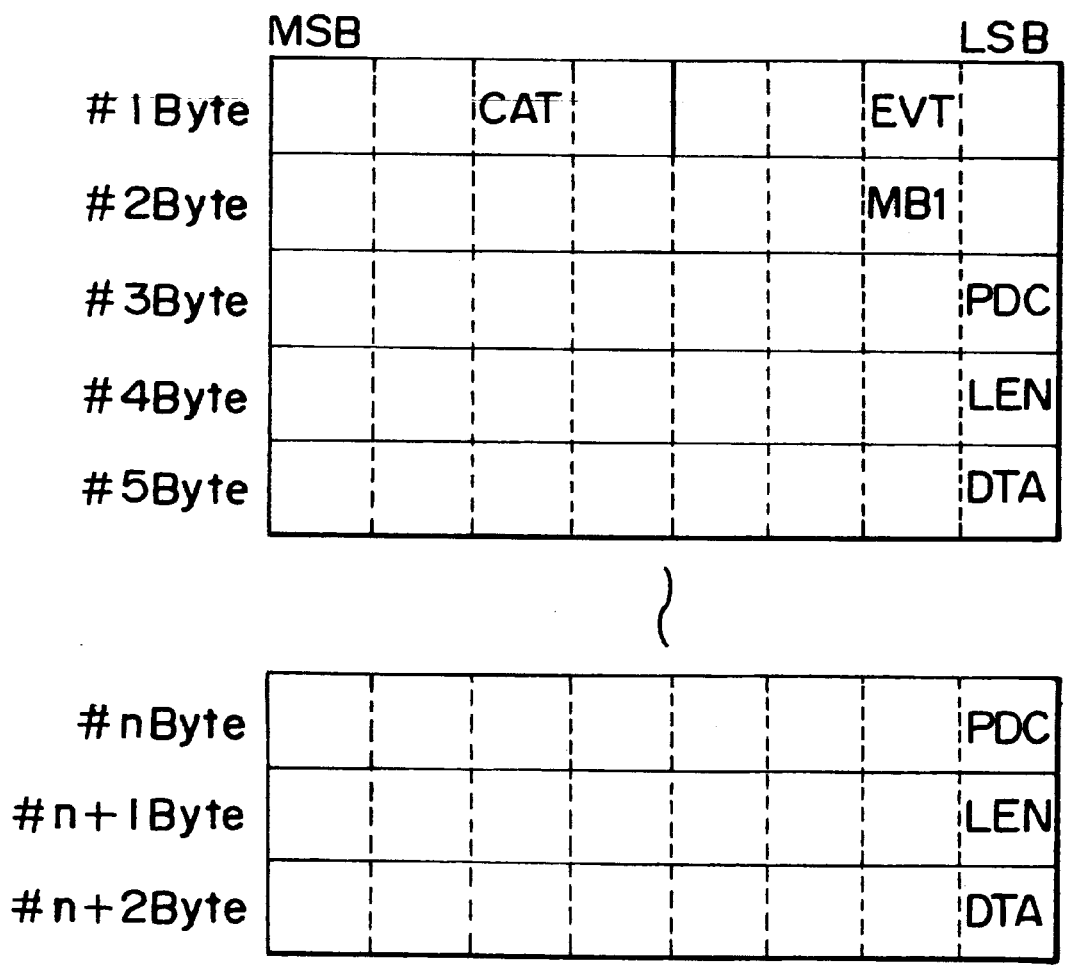
FIG. 23 is a diagram showing a typical data structure of preset information stored in a memory card.

FIG. 23 is a diagram showing a typical data structure of preset information stored in the memory card 1.

A CAT (Category) field shown in the figure is a four-bit field used for recording a category which indicates that the information stored in the memory card is preset information. An EVT (Number of Events) field is a four-bit field used for recording the number of pieces of stored information. An MB1 field is an eight-bit field used for recording the storage capacity of the memory. A PDC (Preset Data Category) field is used for storing a category of preset data. A LEN (Preset Data Length) field is used for storing the data length of the preset data. A DTA (Preset Data) field is used for recording the preset data.

Figure 24:
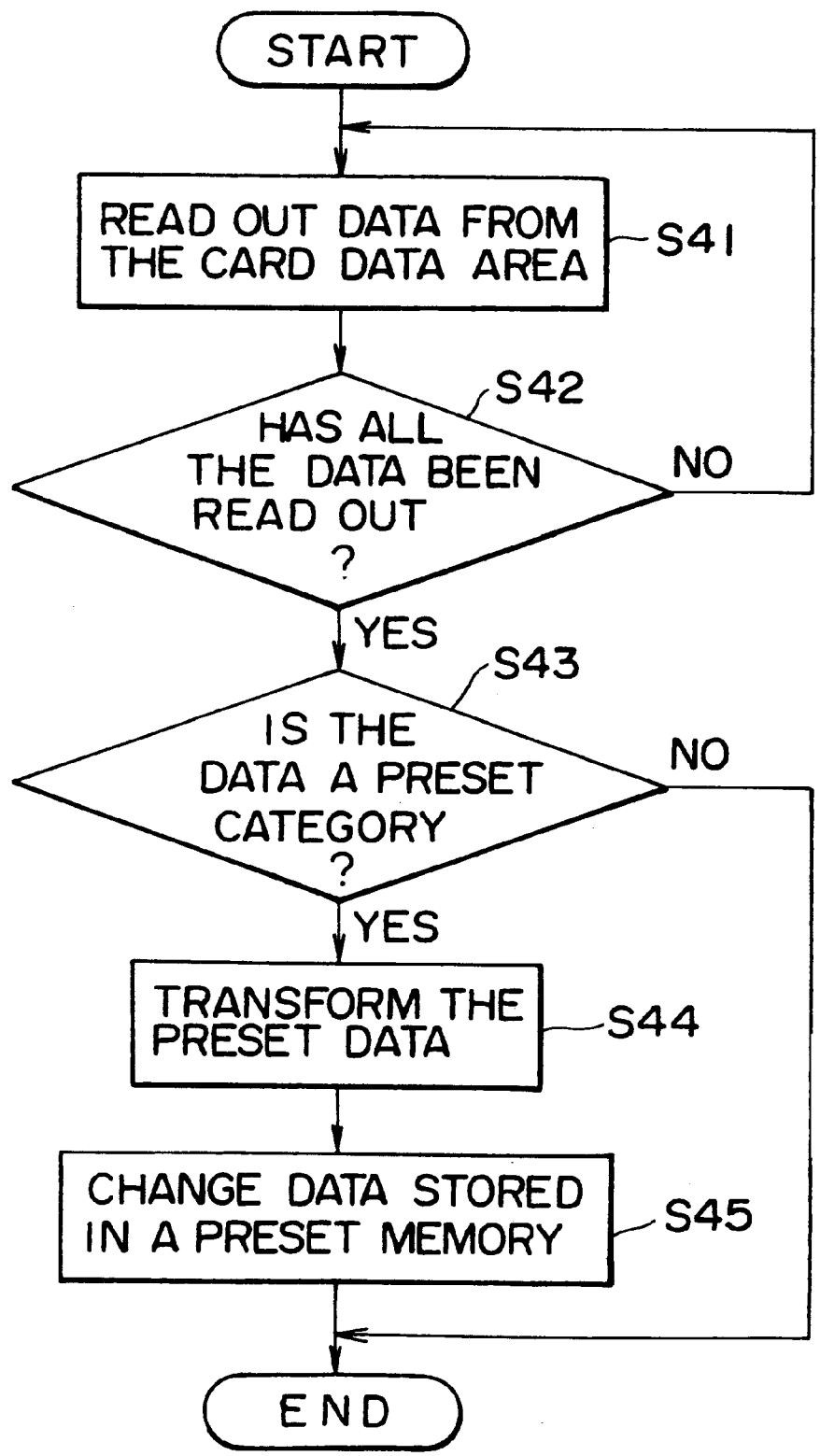
FIG. 24 shows a flowchart used for explaining a procedure of processing to update preset information in a target apparatus in accordance with preset information stored in a memory card.

FIG. 24 shows a flowchart representing a procedure of processing carried out by the microcomputer 95 to update information of a preset memory of the VTR 41 in accordance with preset information recorded in the memory card 1. It should be noted that the preset memory is shown in none of the figures.

As shown in the figure, the flowchart begins with a step S41 at which the microcomputer 95 issues a command to the reader/writer 21 by way of the communication line 32, requesting the reader/writer 21 to read out the preset information recorded in the card data area of the memory card 1 mounted on the cassette 100.

In accordance with the command received from the microcomputer 95, the reader/writer 21 reads out preset information recorded in the card data area of the memory card 1 mounted on the cassette 100 through the antenna 22-1. The flow of processing then goes on to a step S42 to form a judgment as to whether or not all the preset information has been read out from the card data area by the microcomputer 27 employed in the reader/writer 21. If all the preset information has not been read out, the flow of processing returns to the step S41 at which the microcomputer 27 repeats the operation to read out the information till all the preset information is read out from the card data area. If all the preset information has been read out from the card data area, on the other hand, the flow of processing continues to a step S43.

At the step S43, the preset information read out at the step S41 as requested by the microcomputer 95 is checked to form a judgment as to whether or not the preset information read out from the card data area is information corresponding to the preset category. The judgment is based on information recorded in the CAT field of the information read out from the card data area. If the information recorded in the CAT field indicates that the preset information read out from the card data area is information corresponding to the preset category, the flow of processing goes on to a step S44 at which the microcomputer 95 converts the format of the preset information into a format of data to be processed by the microcomputer 95.

The flow of processing then proceeds to a step S45 at which the contents of the preset memory of the VTR 41 are updated with preset data resulting from the conversion carried out at the step 44. As described earlier, the preset memory itself is shown in none of the figures. After that, the processing is completed. If the outcome of the judgment formed at the step S43 indicates that the preset information read out from the card data area is not information corresponding to the preset category, on the other hand, the processing is completed without updating the contents of the preset memory of the VTR 41.

In this way, the user is capable of carrying out a preset operation by merely setting a cassette 100 having a memory card 1 for storing preset data mounted thereon on the VTR 41 without the need to do cumbersome work.

In addition, in the case of this example, by placing only the memory card 1 for storing preset data at a location in close proximity to the reader/writer 21, the reader/writer 21 is capable of reading out the preset data stored in the memory card 1 through the antenna 22-2 without the need for the user to mount the memory card 1 on the cassette 100.

As described above, by mounting a batteryless non-contact-type memory card 1 receiving power from an external source on a cassette or the like, the operation carried out by the user can be made simple, increasing the degree of freedom to use the memory card.

In addition, various kinds of information pertaining to data recorded in a cassette or disc can be stored in the memory card 1 and the information can be used for simplifying operations to display the data, to reproduce a program, to make a timer-based video-recording reservation and to search a tape for a start position, to mention a few.

On the top of that, the present invention can be applied to the ordinary cassette tape or disc by merely mounting the memory card on the ordinary cassette tape or disc. Thus, audio and video recording media such as cassette tapes and floppy discs can be manufactured without changing their specifications and recording formats. As a result, the cassette tapes and discs can be controlled and organized with ease.

In addition, since a non-contact-type system is used, no connection nor junction that is prone to a failure caused by an electrical contact becoming bad is required, allowing communication to be established with a high degree of reliability. Furthermore, the storage capacity of the memory card can be extended by installation of a new memory thereon.

As described above, an EEPROM unit 9 is used in an embodiment. It should be noted, however, that other storage devices can also be employed as well. For example, a memory device consuming only a small amount of power such as the FeRAM (a ferroelectric RAM) can also be used. In this case, the communication distance can also be increased as well.

Also as described above, information stored in the memory card 1 is updated when the cassette is taken out from an apparatus such as a VTR. It should be noted, however, that the information can also be updated periodically or at any time new data for updating the information is generated. As an alternative, the information can also be updated with predetermined timing.

In addition, a ROM unit for storing a program is connected to a microcomputer. It is worth noting, however, that the ROM can also be embedded in the microcomputer.

On the top of that, the data structures of the memory card in the embodiments described above are typical. That is to say, the present invention is not limited to the data structures described above.

Furthermore, in the embodiments described above, the memory card 1 is mounted on a cassette in most cases. It is worth noting, however, that the memory card 1 can be mounted on other recording media such as a FD (floppydisc), a MD (minidisc, a trademark), a tape streamer, an MO (magneto-optics) disc used as a magneto-optic recording medium and optical recording media like a DVD (Digital Versatile Disc), a CD-ROM (Compact Disc Read-Only Memory), a CD (Compact Disc) and a CDV (Compact Disc Video).

Figure 25:
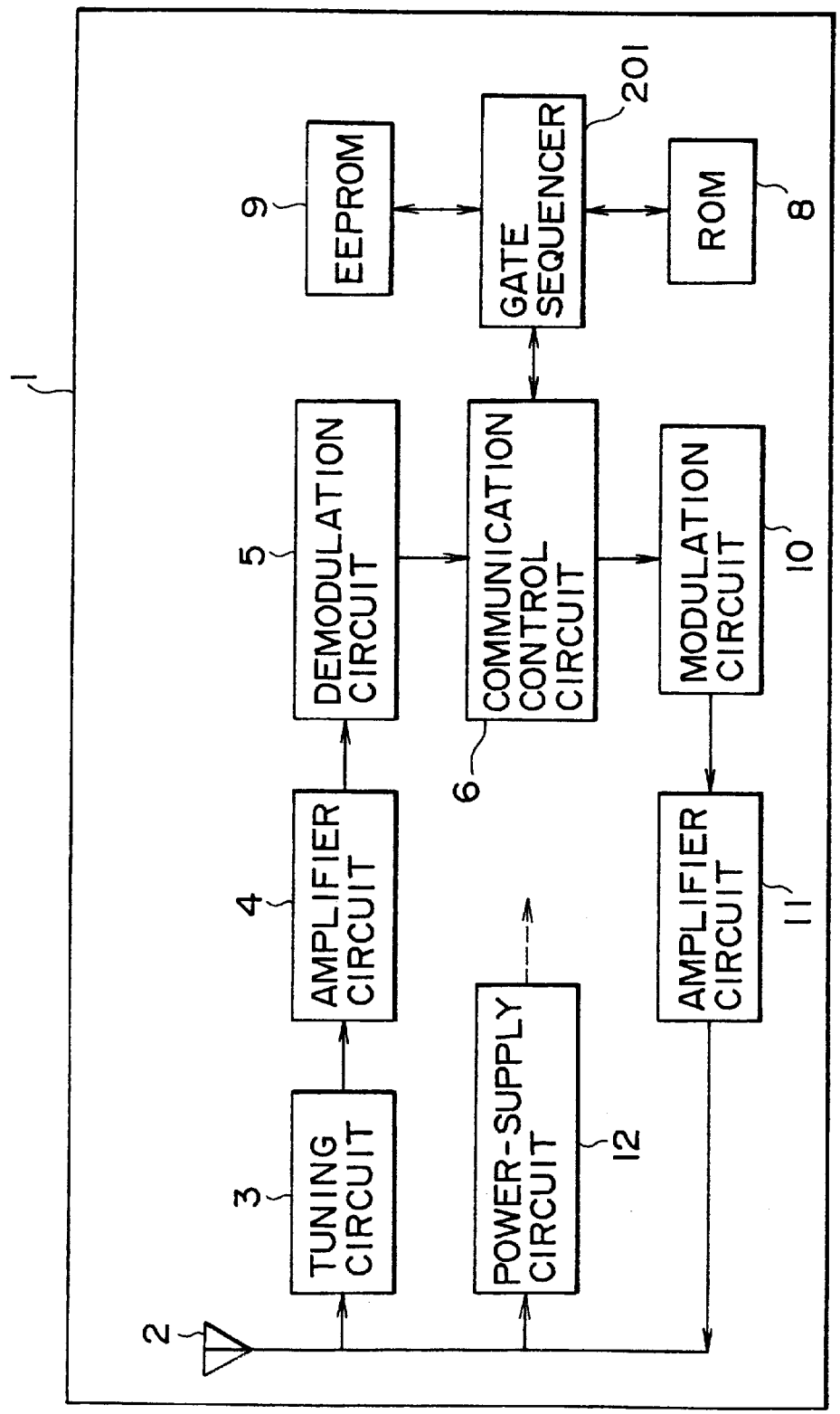
FIG. 25 is a block diagram showing another typical configuration of a memory card.

FIG. 25 is a block diagram showing another typical configuration of a memory card 1. As shown in the figure, this configuration is obtained from the configuration shown in FIG. 1 by replacing the microcomputer 7 shown in FIG. 1 with a gate sequencer 201. The rest is the same as the configuration shown in FIG. 1. That is to say, by replacing the microcomputer 7 in the configuration shown in FIG. 1 with a gate sequencer 201 comprising logic gates, the same functions as those of the microcomputer 7 can be implemented by the gate sequencer 201.

Figure 26:
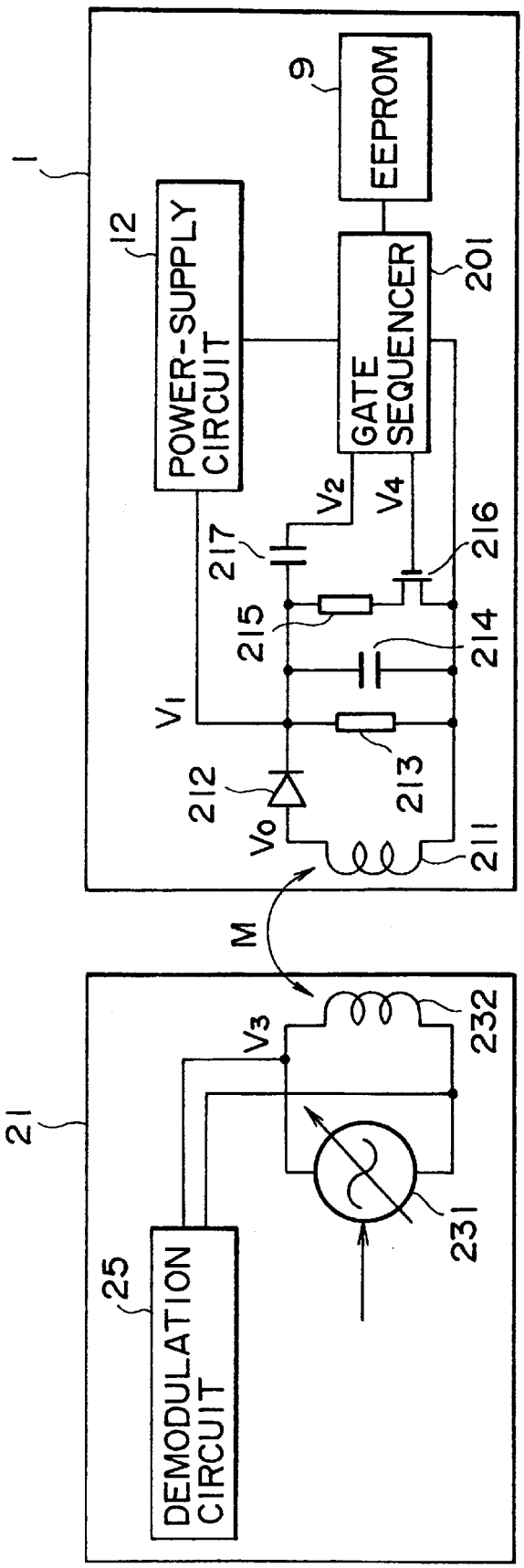
FIG. 26 is a block diagram showing another typical configuration of a meory card and a reader/writer.

FIG. 26 is a block diagram showing another typical configuration of the memory card 1 and the reader/writer 21. As shown in the figure, in this configuration, the antenna 2 employed in the memory card 1 is implemented by a coil 211 whereas the antenna 22 employed in the reader/writer 21 is implemented by a coil 232. Mutual electromagnetic inductive coupling is established between the coils 211 and 232.

In the memory card 1, a diode 212 is connected in series to the coil 211 at one end thereof. The other end of the diode 212 is connected to a resistor 213 and a capacitor 214 which form a resonant circuit with the coil 211. The resonant circuit functions as the tuning circuit 3 shown in FIG. 1.

A series circuit comprising a resistor 215 and a FET 216 is connected to the capacitor 214 in parallel. The gate of the FET 216 is driven by the gate sequencer 201. The other end of the diode 212 is also connected to the gate sequencer 201 through a capacitor 217 and to the power-supply circuit 12.

In the reader/writer 21, on the other hand, a resonant circuit 231 and the demodulation circuit 25 are connected in parallel to the coil 232.

In the configuration described above, a resonant circuit for data transmission is not provided in the memory card 1. Data is transmitted by changing the impedance of the FET 216 by means of the gate sequencer 201 in accordance with the data being transmitted. At that time, an impedance of the right side of the coil 211 seen from the coil 211 in the configuration shown in FIG. 26 changes. As a result, the impedance of coil 232 employed in the reader/writer 21 which is inductively coupled with the coil 211 also changes as well. The demodulation circuit 25 detects changes in current flowing through the coil 232 and changes in voltage appearing between the terminals of the coil 232, demodulating a signal received from the card reader 1.

When data is transmitted from the reader/writer21, the oscillation frequency of the resonant circuit 231 is varied in accordance with the data being transmitted. The changes in frequency are propagated from the coil 232 of the reader/writer 21 to the coil 211 employed in the memory card 1 through the mutual inductive coupling. As a result, the signal transmitted by the reader/writer 21 is supplied to the gate sequencer 201 by way of the capacitor 217. In this way, the signal can be received by the gate sequencer 201.

FIG. 27 shows a flowchart used for explaining processing carried out by the reader/writer 21 to exchange data with the memory card 1 shown in FIG. 26 through the mutual inductive coupling. The processing is carried out typically by a gate sequencer 201 employed in the reader/writer 21. The gate sequencer 201 is the same as that employed in the memory card 1 shown in FIG. 25. It should be noted that the gate sequencer 201 employed in the reader/writer 21 is not shown in FIG. 26.

As shown in FIG. 27, the flowchart begins with a step S61 at which the gate sequencer 201 (employed in the reader/writer 21) controls the resonant circuit 231 which serves as the modulation circuit 10 in accordance with data being transmitted. A carrier is modulated thereby by using the data being transmitted and output from the coil 232.

The flow of processing then goes on to a step S62 at which the gate sequencer 201 forms a judgment as to whether or not data has been received from the memory card 1. It should be noted that the judgment can be formed by finding out whether or not the level of the carrier has changed. If no data has been received from the memory card 1, the flow of processing proceeds to a step S63 to form a judgment as to whether or not a predetermined period of time t0 of typically 250 µs which is set in advance has lapsed since completion of the transmission of the data. If the predetermined period of time t0 has not lapsed, the flow of processing returns to the step S62 at which the gate sequencer 201 agains forms a judgment as to whether or not data has been received from the memory card 1. Thereafter, the pieces of processing of the steps S62 and S63 are carried out repeatedly.

Figure 28:
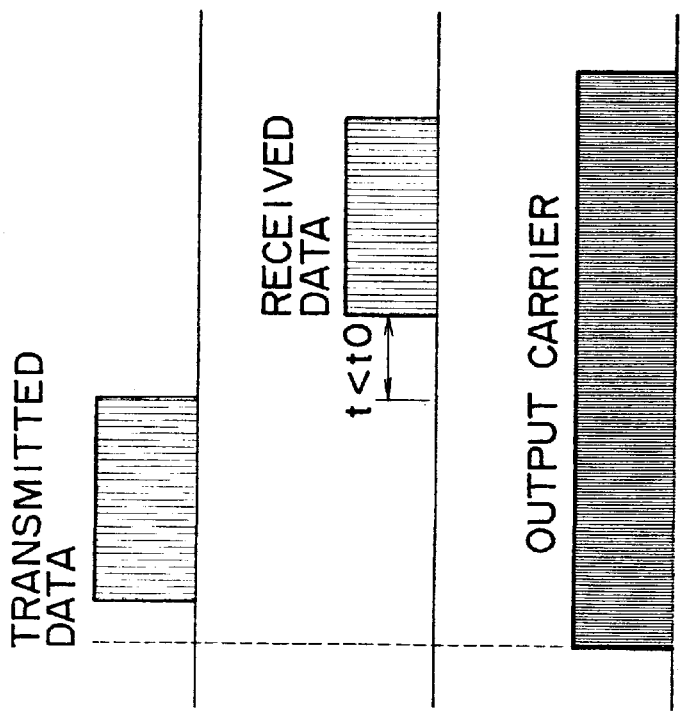
FIG. 28 is a diagram used for explaining the operation of the memory card and the reader/writer shown in FIG. 26.

If the outcome of the judgment formed at the step S62 indicates that data has been received from the memory card 1 after a period of time t has lapsed since the completion of the transmission of the data where t<t0 as shown in FIG. 28, the flow of processing continues to a step S64 at which the gate sequencer 201 sets a transmission period at a period of time t2. The flow of processing then goes on to a step S65 to enter a wait state waiting for the period of time t2 to lapse since the start of the transmission of the data. As the period of time t2 lapses since the start of the transmission of the data, the flow of processing returns to the step S61 to again carry out the processing to transmit data.

Figure 29:
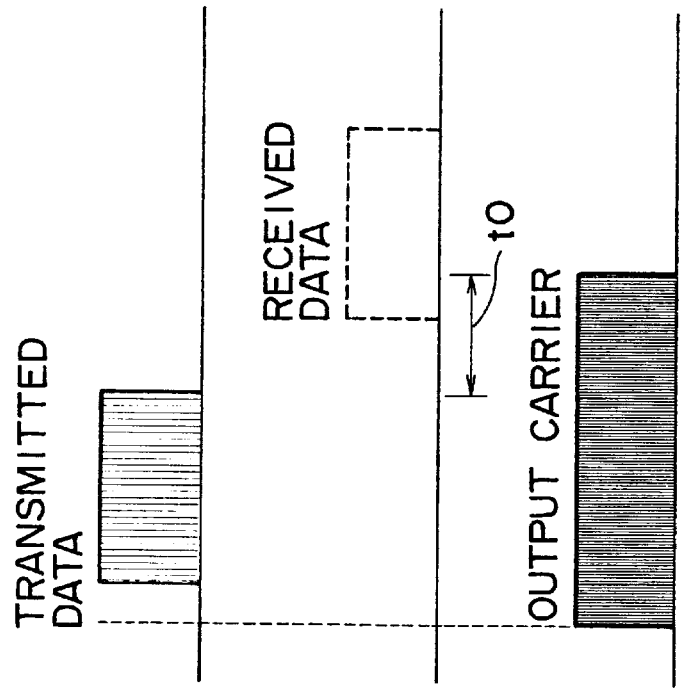
FIG. 29 is another diagram used for explaining the operation of the memory card and the reader/writer shown in FIG. 26.

If the outcome of the judgment formed at the step s63 indicates that the predetermined period of time t0 has lapsed since the completion of the transmission of the data without being able to receive any data from the card reader 1 as shown in FIG. 29, on the other hand, the flow of processing proceeds to a step 66 at which the gate sequencer 201 controls the resonant circuit 231 to end the operation to output the carrier. As a result, a waste of power by unnecessary consumption can be prevented.

Then, the flow of processing goes on to a step S67 at which the gate sequencer 201 sets the transmission period at a period of time t1 which is longer than the period of time t2 set at the step S64. Subsequently, the flow of processing then goes on to a step S68 to enter a wait state waiting for the period of time t1 to lapse since the start of the transmission of the data. As the period of time t1 lapses since the start of the transmission of the data, the flow of processing returns to the step S61 to again carry out the processing to transmit data.

Figure 30:
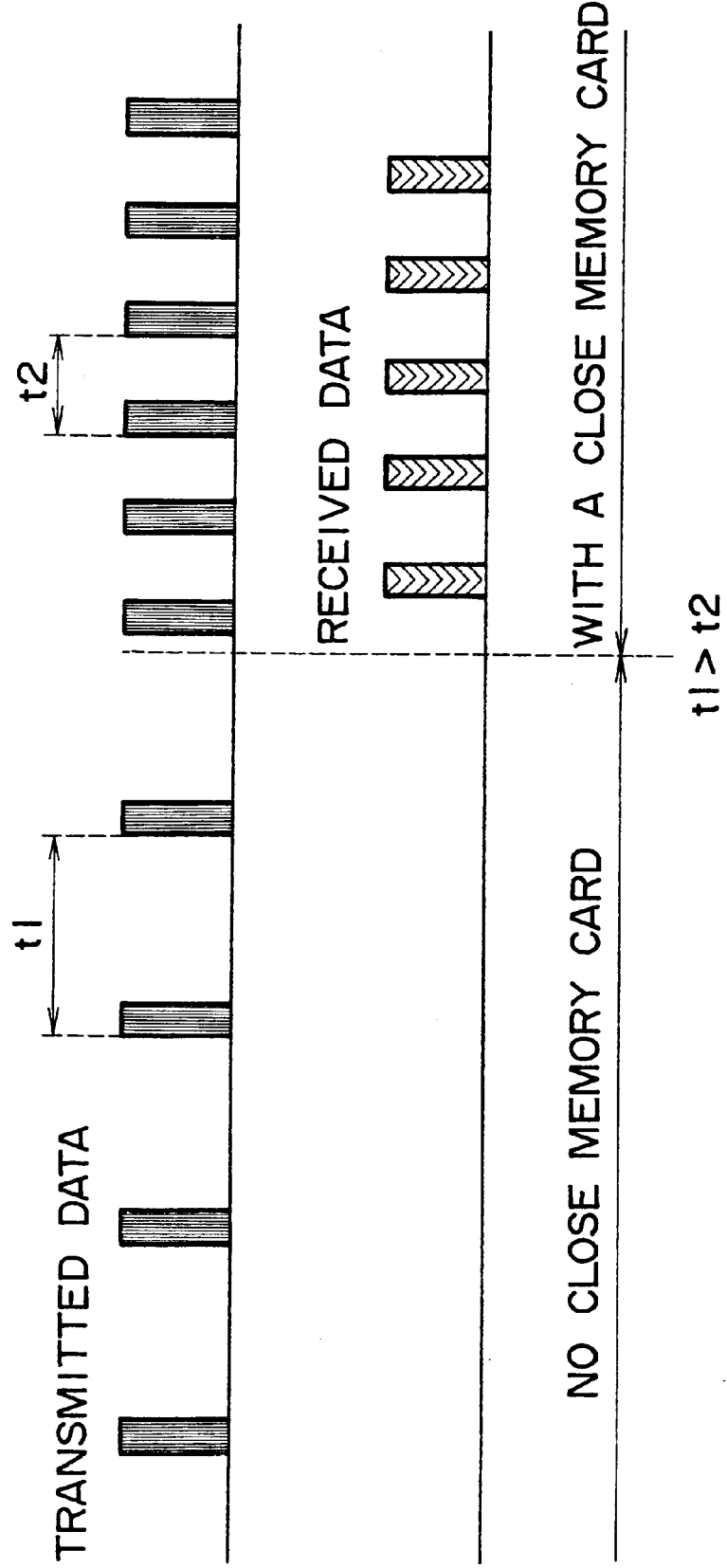
FIG. 30 is a further diagram used for explaining the operation of the memory card and the reader/writer shown in FIG. 26.

According to the scheme described above, in a state with the memory card 1 not placed at a location in close proximity to the reader/writer 21 as evidenced by the YES outcome of the judgment formed at the step S63, that is, as evidenced by the fact that data has not been received from the memory card 1 even after the period of time t0 has lapsed since the completion of the data transmission as shown in FIG. 29, data can be transmitted intermittently at the long transmission period t1 as shown in the diagram on the left side of FIG. 30. In a state with the memory card 1 placed at a location in close proximity to the reader/writer 21 as evidenced by the YES outcome of the judgment formed at the step S62, that is, as evidenced by the fact that data has been received from the memory card 1 before the period of time t0 lapses since the completion of the data transmission as shown in FIG. 28, on the other hand, data is transmitted intermittently at the short transmission period t2 as shown in the diagram on the right side of FIG. 30.

As a result, in a state with the memory card 1 not placed at a location in close proximity to the reader/writer 21, a waste of power by unnecessary consumption can be prevented by reducing the transmission frequency, that is, increasing the transmission period to the length t1. In addition, in a state with the memory card 1 placed at a location in close proximity to the reader/writer 21, data can be received and tarnsmitted more frequently by reducing the transmission period to the length t2.

Typically, the period of time t1 is 10 ms and the period of time t2 is 5 ms.

Figure 31:
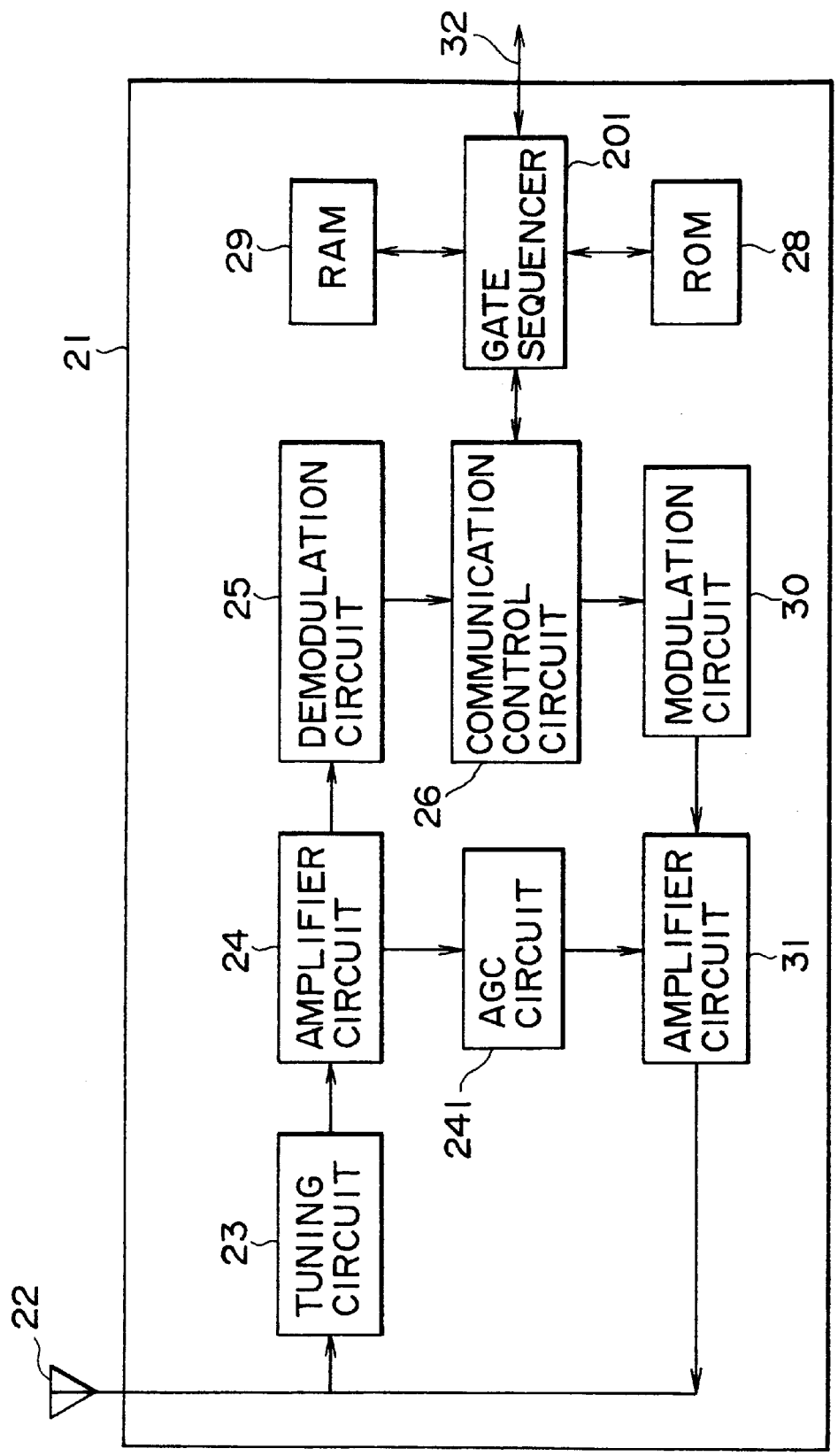
FIG. 31 is a block diagram showing another typical configuration of a reader/writer.

In a configuration wherein data is exchanged through the mutual inductive coupling shown in FIG. 26, the degree of coupling is increased and the level of the carrier is lowered when the distance from the memory card 1 to the reader/writer 21 is shortened. As a result, it is feared that the amount of power supplied to the memory card 1 is reduced, making the communication no longer possible. In order to solve this problem, the reader/writer 21 is provided with an AGC circuit 241 as shown in FIG. 31, a block diagram showing another typical configuration of the reader/writer 21. In this configuration, the gain of the amplifier circuit 31 on the transmission side is controlled in accordance with the level of a signal received by the antenna 22 for compensating the data being transmitted for a decrease in level of the carrier. It should be noted that the AGC circuit 241 functions only during an operation to transmit data. During an operation to receive data, the voltage controlled in an operation to transmit data is held as it is.

FIG. 32 is a diagram showing an application of mounting a memory card 1 on a CD-ROM 252. In general, data recorded in a CD-ROM can not be updated. For example, a CD-ROM is used in car navigation for recording map data. Map data recorded in the CD-ROM becomes obsolete as new roads and new buildings are completed after the map data has been recorded in the CD-ROM. In this case, a memory card 1 can be used for storing map information for newly completed roads and buildings and distributed to users. The memory card 1 can then be mounted on or attached to a CD-ROM 252 which contains map data before changes in map. In this case, a drive 253 of a navigation system or the PC 61 shown in FIG. 6 carries out processing represented by a flowchart shown in FIG. 33.

As shown in the figure, the flowchart begins with a step S81 at which data recorded on the CD-ROM 252 is read out by using a pickup 251 shown in FIG. 32. The flow of processing then goes on to a step S82 to form a judgment as to whether or not the processing to read out data from the CD-ROM 252 has been completed. If the outcome of the judgment indicates that the processing to read out data from the CD-ROM 252 has not been completed, the flow retirns to the step S81 to carry out the pieces of processing of the steps S81 and S82 repeatedly till the processing to read out data from the CD-ROM 252 is completed.

As the outcome of the judgment formed at the step S82 indicates that the processing to reproduce data from the CD-ROM 252 has been completed, the flow proceeds to a step S83 to form a judgment as to whether or not a memory card 1 is attached to the CD-ROM 252. If the outcome of the judgment indicates that a memory card 1 is attached to the CD-ROM 252, the flow of processing continues to a step S84 at which the reader/writer 21 reads out information stored in the memory card 1. Then, the flow of processing goes on to a step S85 at which the drive 253 uses the information read out from the memory card 1 at the step S84 for updating the data reproduced from the CD-ROM 252 at the step S81or merely adds the information to the data. In this way, even if the CD-ROM 252 contains some obsolete map data or contains no information on newly completed roads and buildings, the obsolete map data is updated with the information read out from the memory card 1 or information on newly completed roads and buildings read out from the memory card 1 can be added to the data reproduced from the CD-ROM 252. As a result, the user can use most recent map data.

If the outcome of the judgment formed at the step S83 indicates that a memory card 1 is not attached to the CD-ROM 252, on the other hand, the steps S84 and S85 are skipped.

As descrribed above, the present invention is applied to a CD-ROM used as a recording medium. Likewise, the scope of the present invention also includes a memory card added to a ROM for storing a computer program. In this case, the memory card is used for storing program modifications resulting from a version-up of the program.

It should be noted that information stored in a memory card 1 can be code of a computer program or an executable script.

According to the recording/reproduction apparatus and the recording/reproduction method of the present invention, when transmitting and receiving information to and from a storage apparatus through a plurality of information transmitting/receiving means, a switching means is used for selecting one of the information transmitting/receiving means;

a reading means is used for reading out information stored in the storage apparatus through one of the information transmitting/receiving means selected by the switching means; and an information supplying means is used for supplying update information for updating the information stored in the storage apparatus through one of the information transmitting/receiving means selected by the switching means.

As a result, information stored in a storage apparatus located outside or inside the recording/reproduction apparatus can also be read out as well as updated, allowing cassette tapes and discs to be controlled with ease.

According to the input/output apparatus and the input/output method of the present invention, information on data is transmitted and received to and from a storage apparatus mounted on a recording-medium assembly for recording the data;

information is read out from the storage apparatus; and the information read out from the storage apparatus is output.

As a result, the information on the data recorded in the recording-medium assembly can be acquired with ease.

According to the storage apparatus of the present invention, a storage means is used for storing information;

a power inputting means is used for inputting power supplied by an external apparatus;

an information supplying means is used for providing the information stored in the storage means to the external apparatus; and an information updating means is used for updating the information stored in the storage means with information received from the external apparatus.

As a result, the storage means can be of a non-contact type and is capable of storing information supplied by an external source as well as capable of updating information stored therein.

According to the information processing apparatus and the information processing method of the present invention, information read out from a storage apparatus is used for updating data reproduced from a recording-medium assembly or added to the data. As a result, the user can use the most recent data resulting from the updating of the data reproduced from the recording-medium assembly with the information read out from the storage apparatus or resulting from the addition of the information to the data.

According to the information transmitting apparatus described in claim 19, an information superposing means is used for superposing information to be stored in a storage apparatus on data to be recorded into a recording-medium assembly; and an information transmitting means is used for transmitting the data with the information superposed thereon by the information superposing means.

As a result, information on data to be stored in the storage apparatus mounted on the recording-medium assembly for recording the data can be transmitted by superposing the information on the data and, on the receiving side, the information on the data can be acquired with a high degree of reliability and then stored in the storage apparatus.

What is claimed is:

1. A recording/reproduction apparatus comprising:

recording/reproducing means for recording or reproducing data into and from a recording medium of a recording-medium assembly, said recording medium assembly having a storage apparatus mounted thereon for storing predetermined information;

a first information transmitting/receiving means for transmitting and receiving said information to and from said storage apparatus under a first condition;

a second information transmitting/receiving means for transmitting and receiving said information to and from said storage apparatus under a second condition different from said first condition;

switching means for switching between said first and second information transmitting/receiving means based on the presence of said first or second condition;

reading means for reading out said information stored in said storage apparatus through the first or second information transmitting/receiving means selected by said switching means;

information supplying means for supplying update information for updating said information stored in said storage apparatus through one of said first or second information transmitting/receiving means selected by said switching means; and medium accommodating means for accommodating said recording-medium assembly wherein said switching means switches between said first and second information transmitting/receiving means in accordance with whether or not said recording-medium assembly exists in said medium accommodating means.

2. A recording/reproduction apparatus according to claim 1 wherein said first information transmitting/receiving means is used for exchanging said information between said storage apparatus and said reading means under said first condition of said recording-medium assembly existing inside said medium accommodating means while said second information transmitting/receiving means is used for exchanging said information between said storage apparatus and said reading means under said second condition of said recording-medium assembly existing outside said medium accommodating means.

* * * * *